(12) United States Patent
Nash et al.

(10) Patent No.: US 9,731,489 B2
(45) Date of Patent: Aug. 15, 2017

(54) MATERIAL APPLICATION SYSTEM

(71) Applicant: H.B. FULLER COMPANY, St. Paul, MN (US)

(72) Inventors: Jorge A. Nash, Vancouver, WA (US); Orion A. Cavins, Vancouver, WA (US)

(73) Assignee: H.B. Fuller Company, St. Paul, MN (US)

( * ) Notice: Subject to any disclaimer, the term of this patent is extended or adjusted under 35 U.S.C. 154(b) by 466 days.

(21) Appl. No.: 13/904,781

(22) Filed: May 29, 2013

(65) Prior Publication Data

US 2014/0352882 A1 Dec. 4, 2014

(51) Int. Cl.
| | |
|---|---|
| *B32B 38/00* | (2006.01) |
| *B32B 41/00* | (2006.01) |
| *B32B 38/18* | (2006.01) |
| *B65H 35/08* | (2006.01) |
| *B65H 37/04* | (2006.01) |
| *B65H 39/14* | (2006.01) |

(52) U.S. Cl.
CPC ...... *B32B 38/0004* (2013.01); *B32B 38/1858* (2013.01); *B32B 41/00* (2013.01); *B65H 35/08* (2013.01); *B65H 37/04* (2013.01); *B65H 39/14* (2013.01); *B65H 2701/176* (2013.01); *B65H 2701/1762* (2013.01); *Y10T 156/1062* (2015.01); *Y10T 156/12* (2015.01)

(58) Field of Classification Search
CPC ............ B32B 38/0004; B32B 38/1858; B32B 341/00; Y10T 156/1062; Y10T 156/12
See application file for complete search history.

(56) References Cited

U.S. PATENT DOCUMENTS

| | | | |
|---|---|---|---|
| 2,869,438 A | * | 1/1959 | Watson ............... B31B 1/86 |
| | | | 493/22 |
| 2,953,071 A | | 9/1960 | Heywood |
| 3,537,934 A | | 11/1970 | Munch |
| 3,618,483 A | | 11/1971 | Helm |

(Continued)

FOREIGN PATENT DOCUMENTS

| | | |
|---|---|---|
| DE | 102005009827 | 5/2009 |
| JP | H 324871 | 12/1996 |

OTHER PUBLICATIONS

Non-final Office Action issued in U.S. Appl. No. 13/867,709, mailed Sep. 16, 2015, 8 pages.

*Primary Examiner* — Mark A Osele
*Assistant Examiner* — Christopher C Caillouet
(74) *Attorney, Agent, or Firm* — Kirsten Stone; Wayne W. Rupert

(57) ABSTRACT

A system for applying a material to a substrate comprising:
a feed section that comprises a feed roll and configured for advancing a material along a predetermined path;
a material applicator roll configured to receive the material from the feed roll and apply a cut length of material to a substrate;
a knife element located between the feed section and the material applicator roll; and
a non-vacuum anvil roll positioned near the knife element,
wherein the knife element and the non-vacuum anvil roll are positioned along the path of the material and engage the material to cut the material into the cut length of material for applying to the substrate, and wherein the material contacts the peripheral surface of the non-vacuum anvil roll only at a cut engagement point.

8 Claims, 30 Drawing Sheets

(56) References Cited

U.S. PATENT DOCUMENTS

| | | | |
|---|---|---|---|
| 3,886,033 A | | 5/1975 | Hughes et al. |
| 3,957,570 A | | 5/1976 | Helm |
| 4,181,558 A | | 1/1980 | Neubronner |
| 4,210,481 A | | 7/1980 | Wolff et al. |
| 4,332,635 A | | 6/1982 | Holbrook et al. |
| 4,364,787 A | | 12/1982 | Radzins |
| 4,743,325 A | | 5/1988 | Miyake |
| 5,068,004 A | | 11/1991 | Moll |
| 5,192,385 A | | 3/1993 | Moll |
| 5,415,716 A | * | 5/1995 | Kendall ................. 156/256 |
| 6,149,755 A | | 11/2000 | McNichols et al. |
| 6,360,640 B1 | | 3/2002 | Cote |
| 6,893,528 B2 | | 5/2005 | Middelstadt et al. |
| 7,005,028 B2 | | 2/2006 | Middelstadt et al. |
| 7,172,666 B2 | | 2/2007 | Groves et al. |
| 2004/0112517 A1 | * | 6/2004 | Groves ............. B65H 35/0013 156/264 |
| 2008/0196564 A1 | | 8/2008 | McCabe |

\* cited by examiner

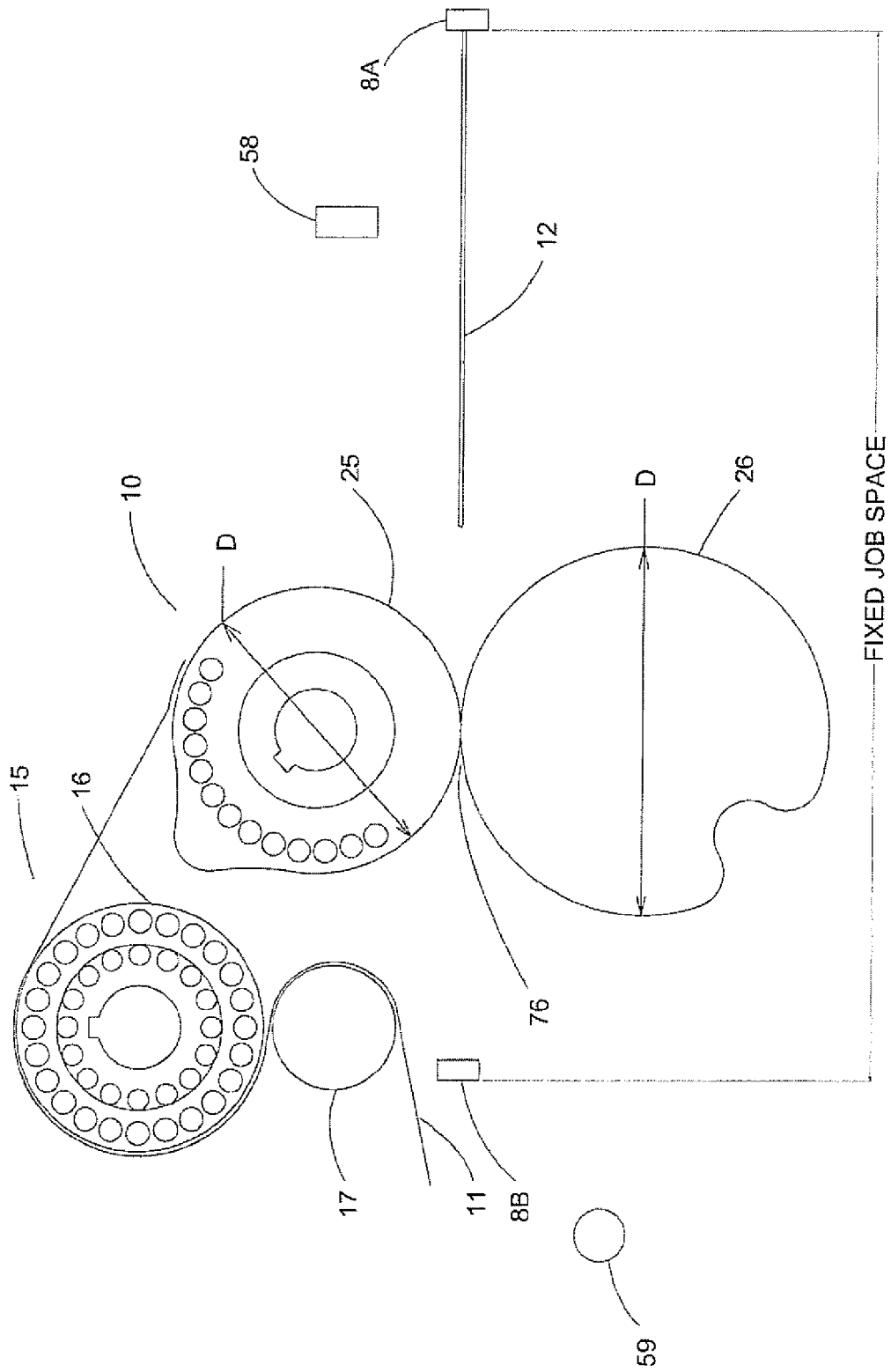

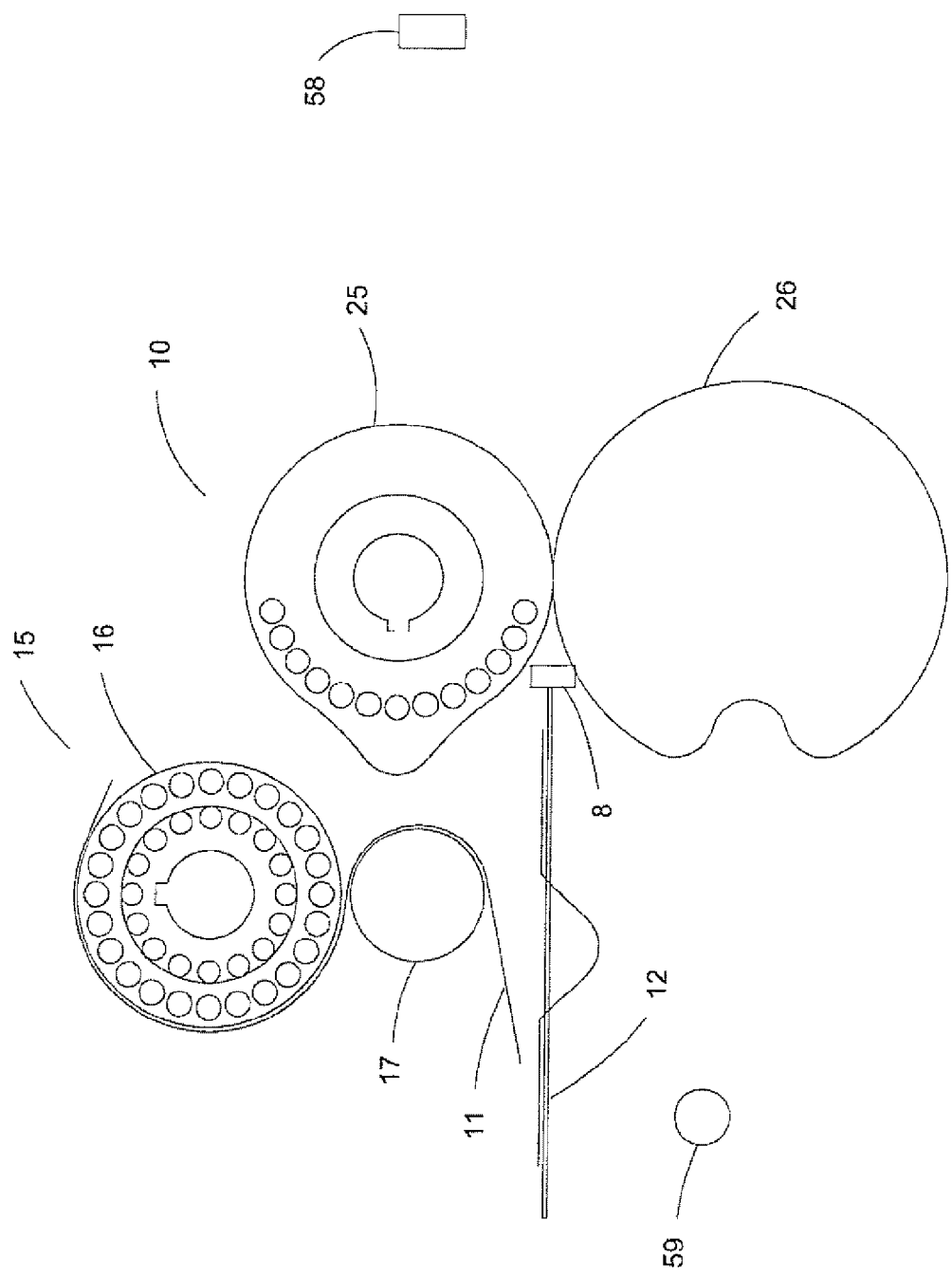

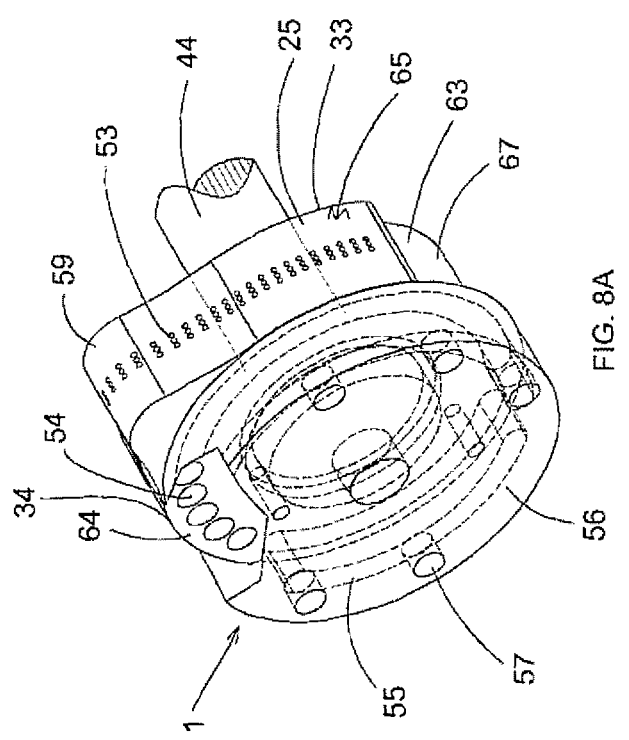

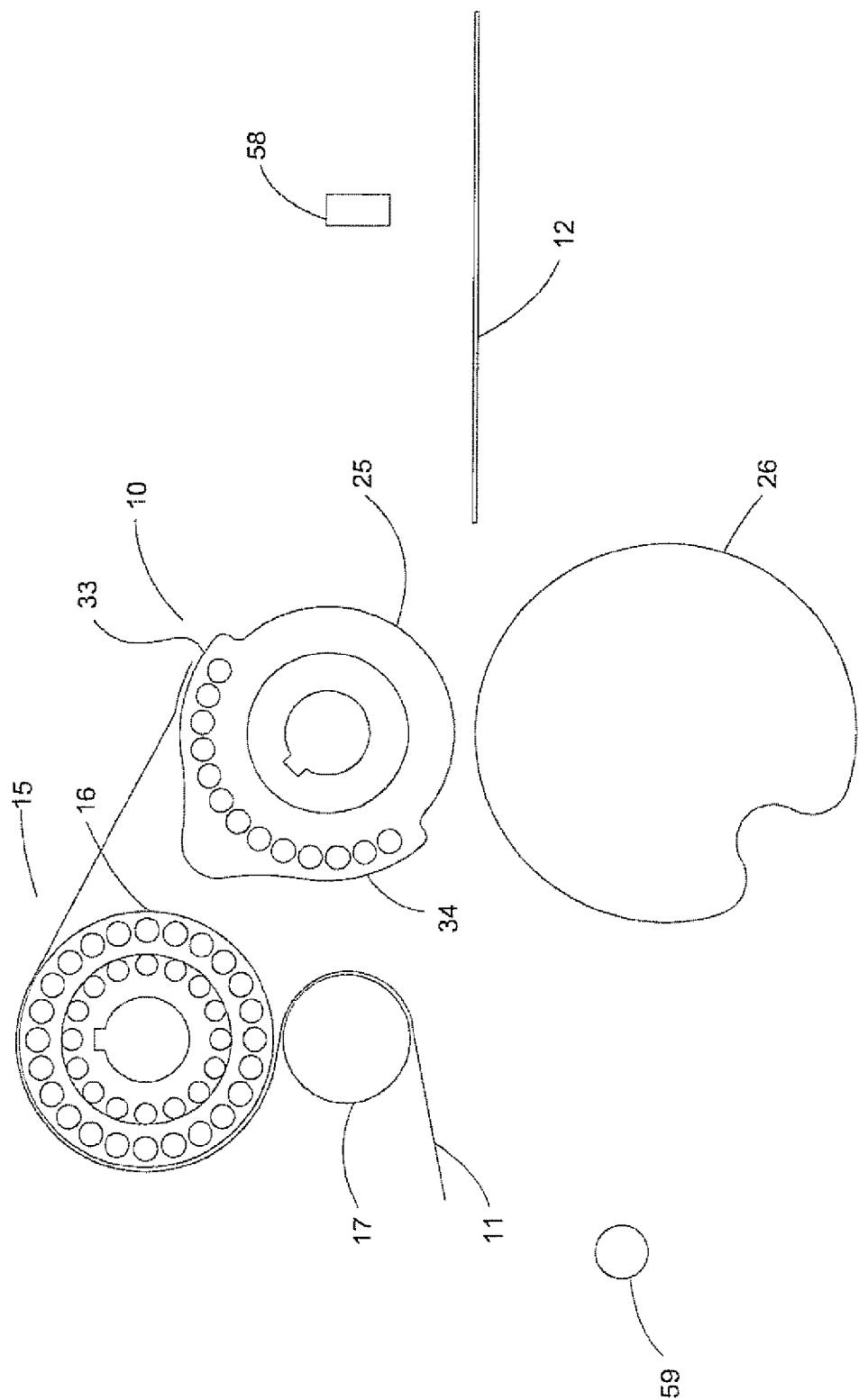

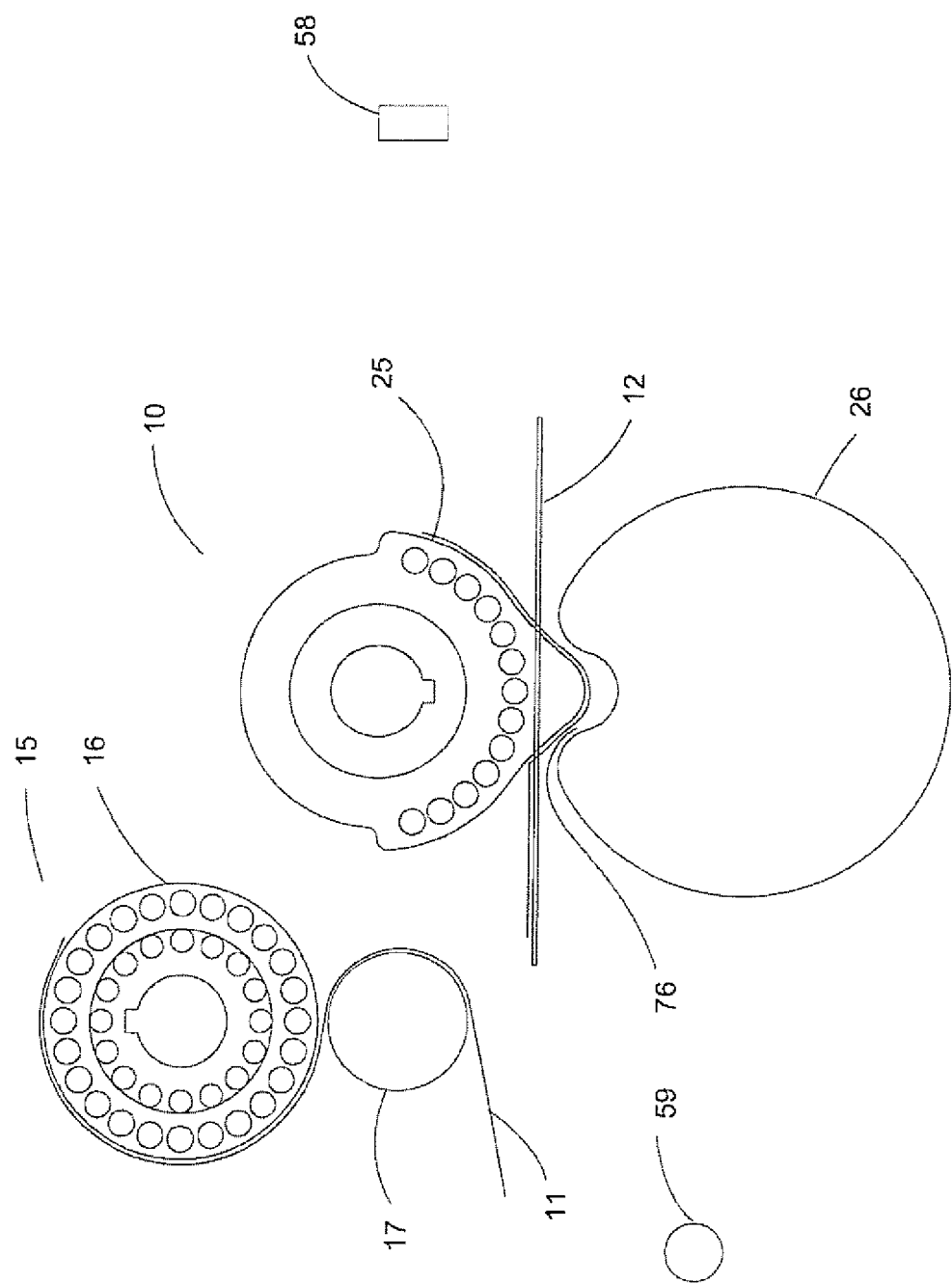

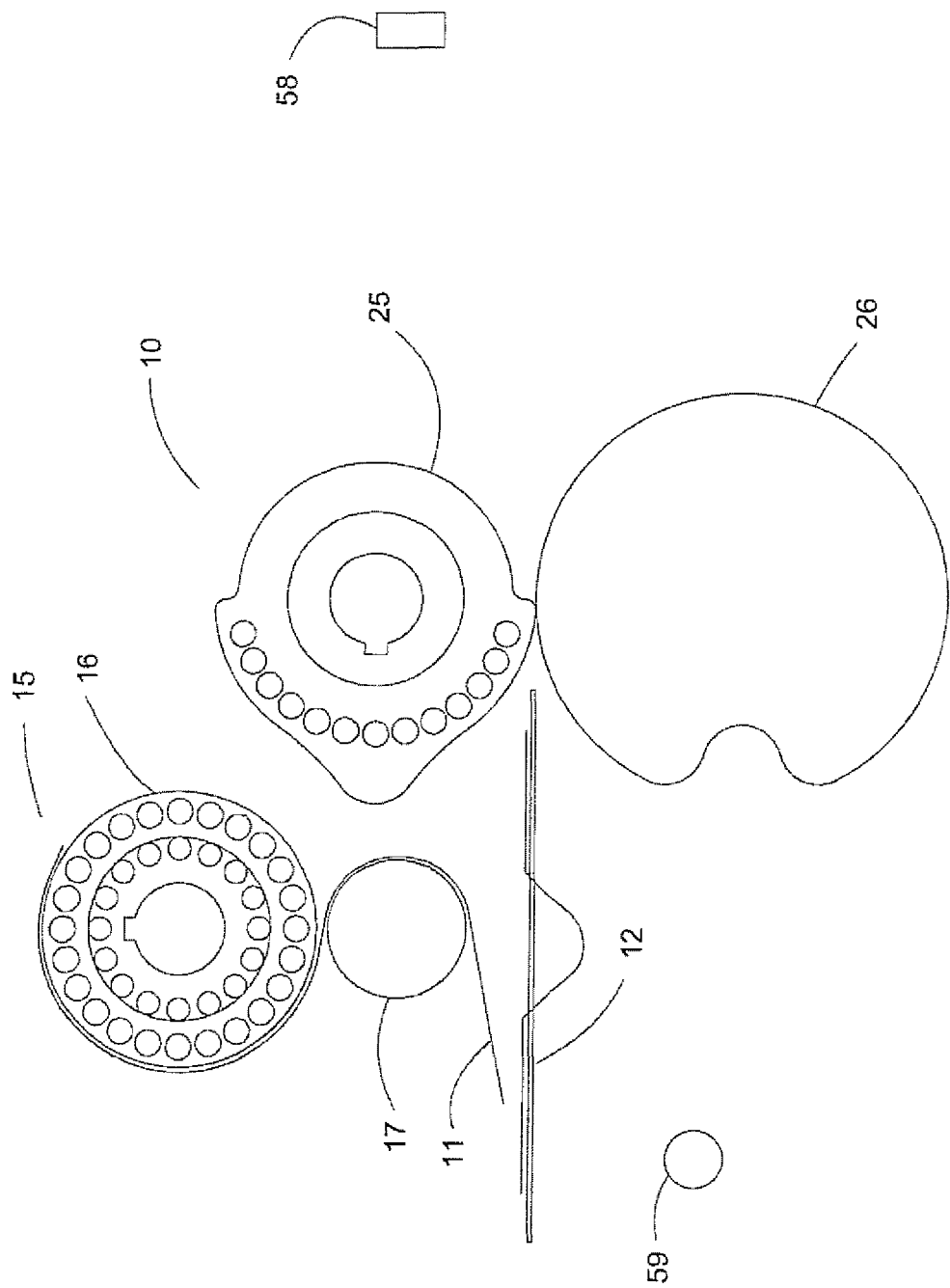

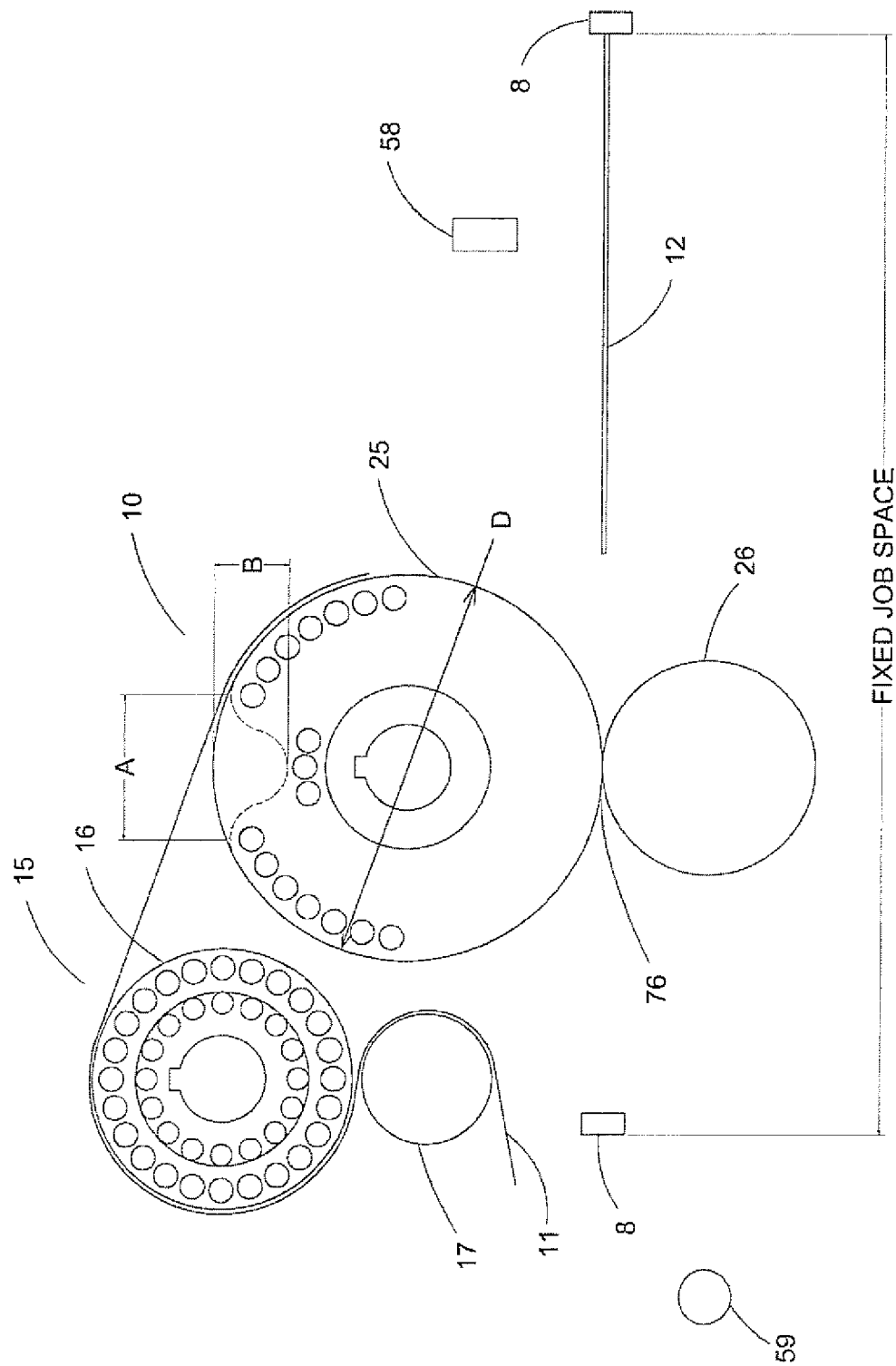

MATERIAL APPLICATION SYSTEM

SUMMARY

Disclosed herein is a system for applying a material to a substrate comprising:

a feed section that comprises a feed roll and configured for advancing a material along a predetermined path;

a material applicator roll configured to receive the material from the feed roll and apply a cut length of material to a substrate;

a knife element located between the feed section and the material applicator roll; and a non-vacuum anvil roll positioned near the knife element, wherein the knife element and the non-vacuum anvil roll are positioned along the path of the material and engage the material to cut the material into the cut length of material for applying to the substrate, and wherein the material contacts the peripheral surface of the non-vacuum anvil roll only at a cut engagement point.

Also disclosed herein is a system for applying a material to a substrate comprising:

a feed section that comprises a feed roll and configured for advancing a material along a predetermined path;

a material applicator roll configured to receive the material from the feed roll and apply a cut length of material to a substrate;

a knife element located between the feed section and the material applicator roll; and a non-vacuum anvil roll positioned near the knife element, wherein the system is configured so that the material passes directly from the feed roll to the material applicator roll without substantially contacting any other roll positioned between the feed roll and the material applicator roll except at an engagement point between the knife element and the non-vacuum anvil roll to cut the material into the cut length of material for applying to the substrate.

Further disclosed herein is a method for applying a material to a series of substrates, comprising:

advancing a material from a feed roll through a path between a knife element and a non-vacuum anvil roll;

cutting the material to form cut lengths of material by engaging the knife element with the non-vacuum anvil roll;

introducing the cut lengths of material onto a material applicator roll, applying the cut lengths of material to the substrates; and controlling the feed rate and the timing of each cutting of the material so as to register the positions of the cut lengths of material with predetermined locations on the substrates and control the length of each cut length, wherein the material contacts the peripheral surface of the non-vacuum anvil roll only at a cut engagement point.

The foregoing and will become more apparent from the following detailed description, which proceeds with reference to the accompanying figures.

BRIEF DESCRIPTION OF THE DRAWINGS

The system and methods disclosed herein will be described with reference to the accompanying drawings wherein:

FIG. 7B-7F is a diagrammatic fragmentally elevational view of the first embodiment illustrating the features of an applicator system;

FIG. 8A is a perspective view of a second embodiment of a contour vacuum applicator roll as viewed from the upper right side;

FIG. 8B-8F is a diagrammatic fragmentally elevational view of the second embodiment illustrating the features of an applicator system;

FIG. 9B-9F is a diagrammatic fragmentally elevational view of the third embodiment illustrating the features of an applicator system;

DETAILED DESCRIPTION

Figure 1:
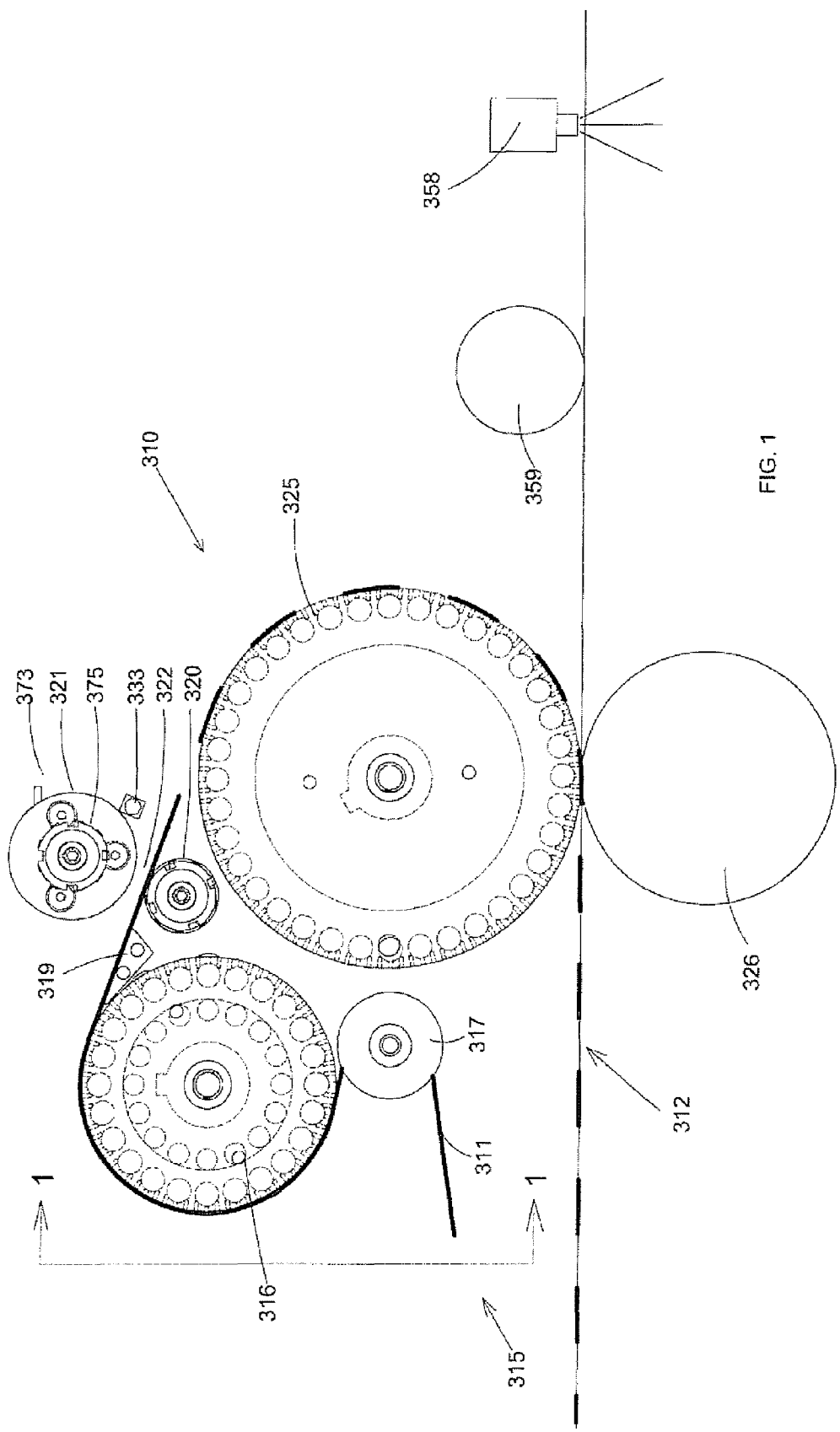
FIG. 1 is a diagrammatic fragmentally elevational view illustrating the features of a material applicator.

Disclosed herein are methods and systems for continuously cutting materials into predetermined lengths, and then continuously applying the cut lengths of material to a substrate or a series of substrates. The material length and placement onto the substrate are adjustable with these methods and systems.

The presently disclosed methods and systems are useful with any type of material, and with any type of substrate. In one particular example, a tape with a coating of adhesive is applied to a substrate such as, for example, a paper product. The material may include, but is not limited to, various ribbon materials, various web materials, and various widths and lengths of material. The materials may include films, non-woven materials, paper materials, composite or laminated tapes, tear tapes or reinforcement tapes such as Sesame® and Enforcer® tapes available from H.B. Fuller, and tapes with adhesives. Particularly preferred are flexible materials that can form a handle and that include an adhesive such as a hot melt adhesive, a pressure sensitive adhesive, a remoistenable adhesive, a heat activated adhesive, a hot melt pressure sensitive adhesive, a hot melt remoistenable adhesive, a water dispersible hot melt adhesive, a biodegradable hot melt adhesive or a repulpable hot melt adhesive. Examples of these adhesives are any typical hot melt adhesive such as an ethylene-vinyl acetate copolymer (EVA-based) hot melt adhesive; EMA-based hot melt adhesive (ethylene methylacrylate); EnBA-based hot melt adhesive (ethylene n-butyl acrylate); hot melt adhesive based on polyamides; hot melt remoistenable adhesive based on polyamides and copolyesters; hot melt adhesives based on polyethylene and polypropylene homopolymers, copolymers and interpolymers, rubbery block copolymer hot melt adhesives; or RF (radio frequency) activatable adhesives. The material, for example, may generally be an adhesive tape comprising a backing of between 2 mils (0.05 mm) to about 7 mils (0.18 mm) in thickness comprised of a polymeric web selected from the group comprising polyester, polypropylene, polyethylene, and mixtures thereof. Alternatively, the backing may be a cellulosic material selected from paper, a paper/polymeric film laminate, or a fiber-reinforced paper.

The substrate may include films, non-woven webs, paper products, paper board, carton blanks, box board, corrugated board, and other sheet materials and web materials, all of various widths and lengths.

Disclosed herein are methods and systems for continuously cutting materials into predetermined lengths, and then continuously applying the cut lengths on a predetermined position on a substrate or a series of substrates. The cut lengths of material are applied such that they are in registry with a predetermined location on the substrate. The material feed rate and the timing of the cutting determines the length and placement of material on the substrate. The system generally includes a material feed to advance the material along a predetermined path through a material knife element and an anvil roll and then onto a vacuum applicator transfer roll.

The systems generally include a material feed section and a material cutting section. The material feed section may include a feed mechanism for advancing the material along a predetermined path through the material cutting section. The material cutting section may include a knife element, such as a rotary knife (also referred to herein as a "rotary knife roll" or "cutting roll"), and a feed roll (e.g. a vacuum feed roll).

In certain embodiments, changes in the length of material can be made without requiring mechanical adjustments of the basic components of the system. In particular, the feed roll and the knife roll may have separate drive means for rotating the feed roll and the knife roll. The timing of the cutting of the material and the length of the material piece may be adjusted independently by controlling the peripheral speeds of the feed roll and the trigger rate of the knife roll. The speeds can be effectively adjusted by the use of a motor control. The positioning of a length of material on the substrate is accomplished by an integrated control system (ICS) such as ControlLogix by Rockwell Automation that provide discrete, drives, motion, process and safety control together with communication and I/O in one package so that the length of material applied and the location of the material on the substrate can be changed and controlled easily.

The system 310 may include a feed section, generally designated 315, which advances material 311 from a supply (not shown) and places a cut length on an application wheel 325 in a desired length. The applicator vacuum wheel 325 advances the cut lengths of material 311 to a substrate 312.

Figure 6:
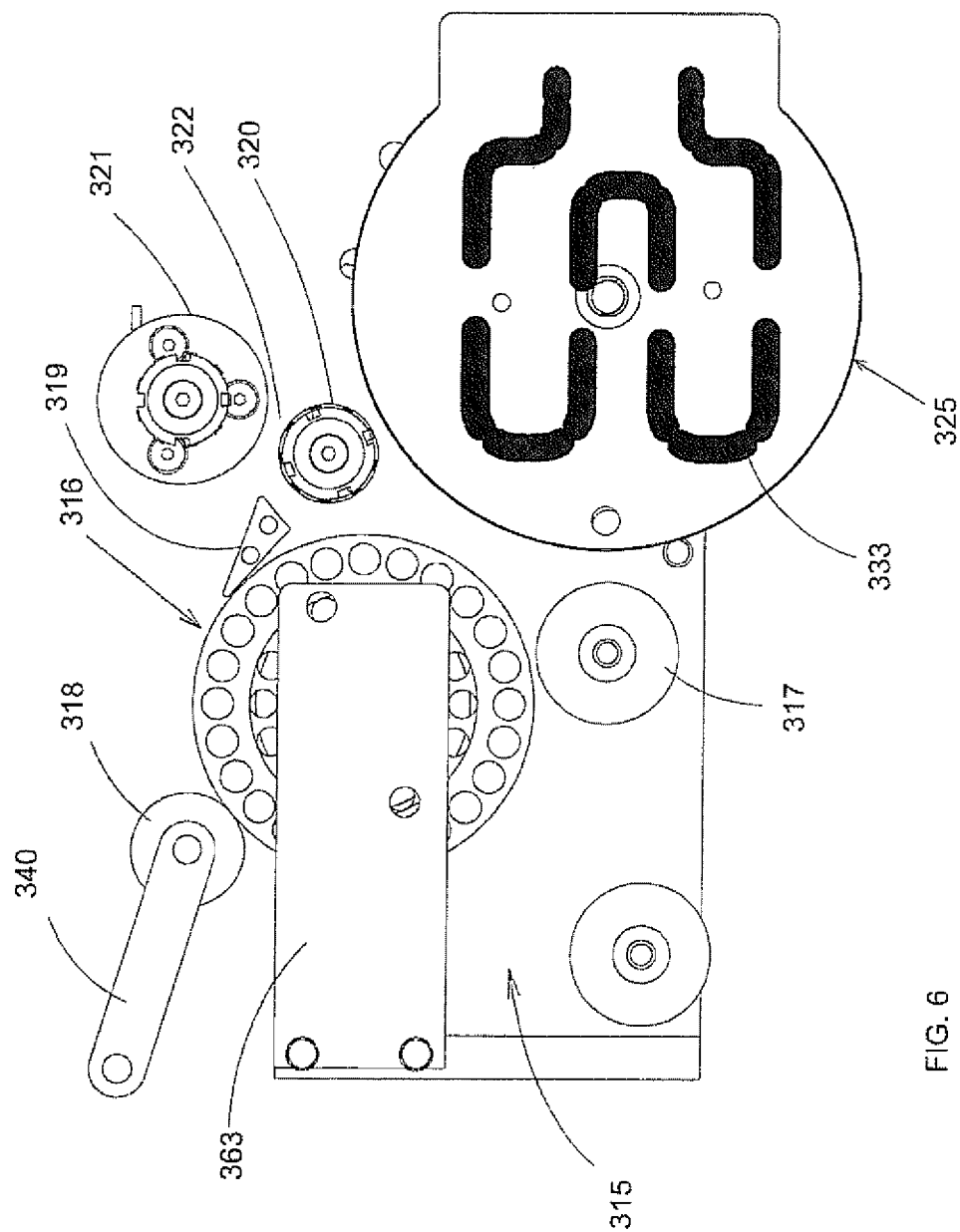
FIG. 6 is a diagrammatic fragmentally elevational view illustrating the features of a material applicator including a resistive heater tape preparation system and a material feed roll collaborating with a pressure roll.

The feed section 315 includes a feed roll 316 with the non-adhesive side of the material 311 directed toward the surface of the feed roll 316. The feed roll 316 cooperates with a vacuum (as shown in FIG. 1) or cooperates with at least one pressure roller 318 (as shown in FIG. 6), for advancing the material 311 from the supply thereof over an idler pulley 317 and then around the feed roll 316. The material 311 may contact, for example, about 30 to about 300 degrees of the feed roll 316. The material 311 is then threaded over an optional guide plate 319 between a knife roll 321 and an anvil roll 320 defining a path to a transfer area onto the vacuum applicator 325. The anvil roll 320 is a non-vacuum anvil roll. The material is cut at a cut engagement point 322 defined between the rotary knife roll 321 and the anvil roll 320, to the desired repeatable lengths by timing the instant of cut with the desired length of material fed by the feed roll 316. In certain embodiments, the material 311 contacts the peripheral surface of the non-vacuum anvil roll 320 only at a cut engagement point. In certain embodiments, the material 311 contacts less than 2 degrees, more particularly, less than 1 degree of the peripheral surface of the non-vacuum anvil roll 320.

According to a further embodiment shown in FIG. 6, feed section 315 includes a feed roll 316, with the non-adhesive side of the material 311 directed toward the peripheral surface of the feed roll 316. The feed roll 316 cooperates with at least one pressure roller 318, for advancing the material 311 from a supply thereof over an idler pulley 317 and then around the feed roll 316. The material 311 may contact, for example, about 30 to about 300 degrees of the feed roll 316. The material 311 is then threaded over an optional guide plate 319 between the knife roll 321 and the anvil roll 320 defining a path to a transfer area onto the vacuum applicator 325. The material is cut at a cut engagement point 322 defined between the rotary knife roll 321 and the anvil roll 320, to the desired repeatable lengths by timing the instant of cut with the desired length of material fed by the feed roll 316. In certain embodiments, the material 311 contacts the peripheral surface of the non-vacuum anvil roll 320 only at a cut engagement point. In certain embodiments, the material 311 contacts less than 2 degrees, more particularly, less than 1 degree of the peripheral surface of the non-vacuum anvil roll 320.

In one embodiment (see FIGS. 2 and 3), the vacuum material feed roll 316 comprises a hub 345 mounted on a shaft 346. The hub 345 is formed of metal or a composite of material, and may be coated with material having a coefficient of friction sufficient to aid in advancing the web material 311. The non-adhesive surface of the tape 311 may contact about 30 degrees to about 300 degrees of the peripheral surface of the vacuum material feed roll 316. The feed roll 316 defines a series of axially extended holes 348 formed in one end wall 349 of the hub 345. The holes 348 are positioned near the periphery of the roll 316 and are spaced circumferentially to communicate with axial rows of holes 350 defined in the surface of the roll 316, and extending radially into the hub 345 from the peripheral surface. Mounted against the end wall 349 of the hub 345 is a manifold 360. The manifold 360 has a grooved arcuate slot 361 extending about 130 to 225 degrees about its end wall adjacent axially to the end wall 349 of hub 345. The manifold 360 is supported in a fixed position by a bracket 363, and the slot 361 is positioned adjacent the path of the axially extended holes 348 on the hub 345. As the hub 345 of the vacuum feed roll 316 rotates, the holes 348 serially come into communication with the slot 361 and the air is exhausted from the holes 348 and from the holes 350 creating a force against one side of the material 311 which is less than atmospheric (e.g., a vacuum), and thus the atmospheric pressure holds the material against the foraminous surface of the roll 316 in the area of the slots 361 as it rotates the holes 348 along the slot 361. As the vacuum roll 316 rotates, the holes 348 become aligned or substantially aligned with the slot 361 and the holes 350 draw the material 311 against the surface of the vacuum roll 316. This moves the material along with the rotation of the vacuum roll 316. During the continued rotation, the holes 348 are covered by the adjacent end wall of the manifold 360. The pressure holding the material on the surface of the roll 316 over the holes 350 is such that the roll 316 moves the material 311 at the same speed as the roll 316, not allowing slippage of material 311 on the roll 316.

Material feed 316 holds the leading edge of each piece of material 311 on the feed roll 316 until it can be transferred onto the vacuum applicator transfer roll 325. As the feed roll 316 rotates, the leading edge of the material 311 advances past the end of the vacuum created section of roll 316. The leading edge of the material 311 is now no longer under the control of the vacuum feed roll 316. The gravity and sub atmospheric pressure, or vacuum at the surface of the vacuum applicator roll 325, cause the leading edge of the material 311 to leave the feed roll 316 and to fall against the vacuum applicator roll 325. As the vacuum applicator roll 325 rotates, it continues to pick up more of the length of the material. Once the predetermined length and position of the material has been transferred from the feed roll 316 to the vacuum transfer roll 325, the rotary knife 321 and anvil roll 320 are made to rotate thereby cutting the material 311. At this point, the entire single piece of a cut length material 311 gets transferred onto the vacuum applicator transfer roll 325. The transfer roll 316 holds the leading edge of the next piece of material until it too is transferred onto the vacuum applicator transfer roll 325.

Figure 4:
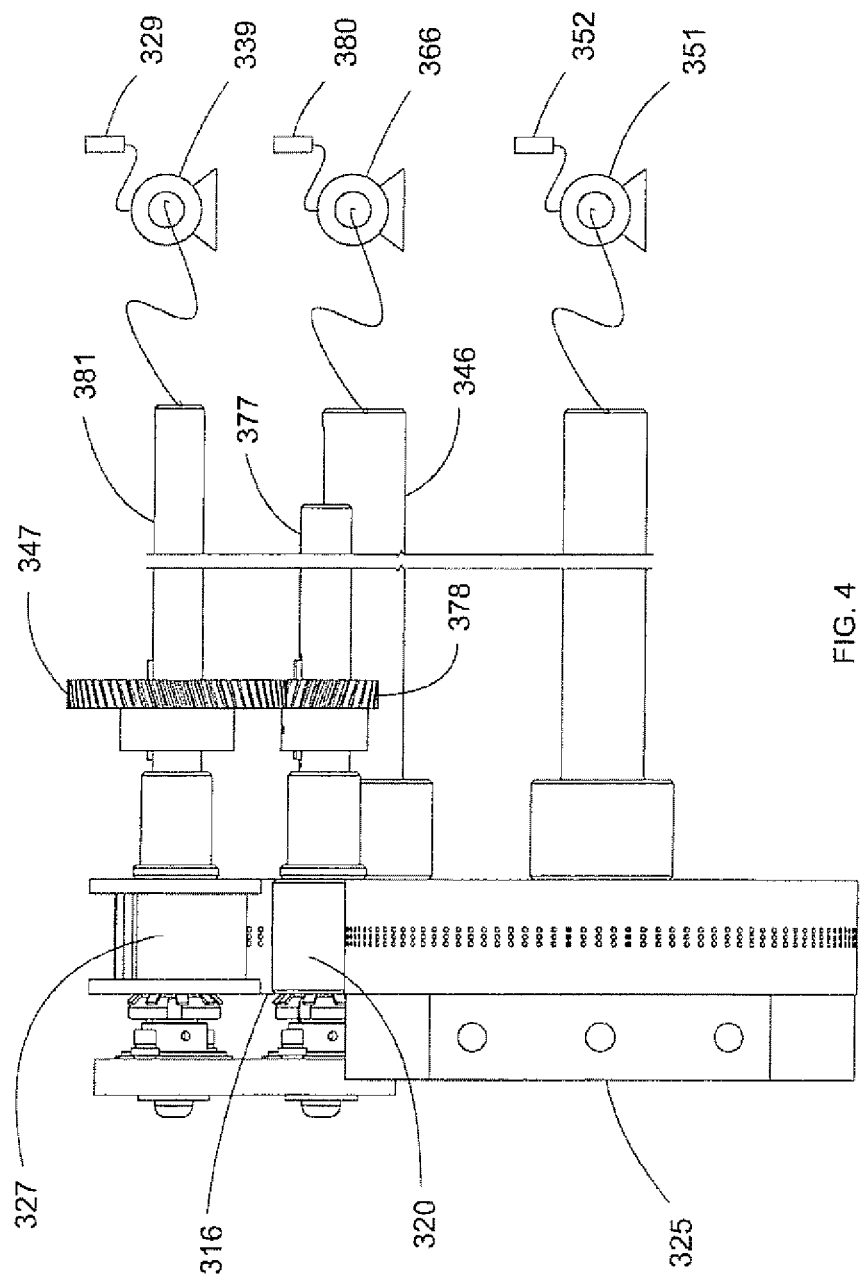
FIG. 4 is a virtual sectional view of the feed roll, the knife and anvil roll, and vacuum applicator transfer roll as seen along line 1-1 of FIG. 1.

In the embodiment depicted in FIG. 4, the knife roll 321 is driven by shaft 381. Shaft 381 is driven by a first motor 339, such as a servomotor. The motor 339 drives the shaft 381 and a gear 347, which in turn meshes with a second gear 378. The second gear 378 is supported on a rotatable shaft 377, to drive that shaft 377 and the anvil roll 320. The motor 339 is controlled by motor controller 329.

Figure 2:
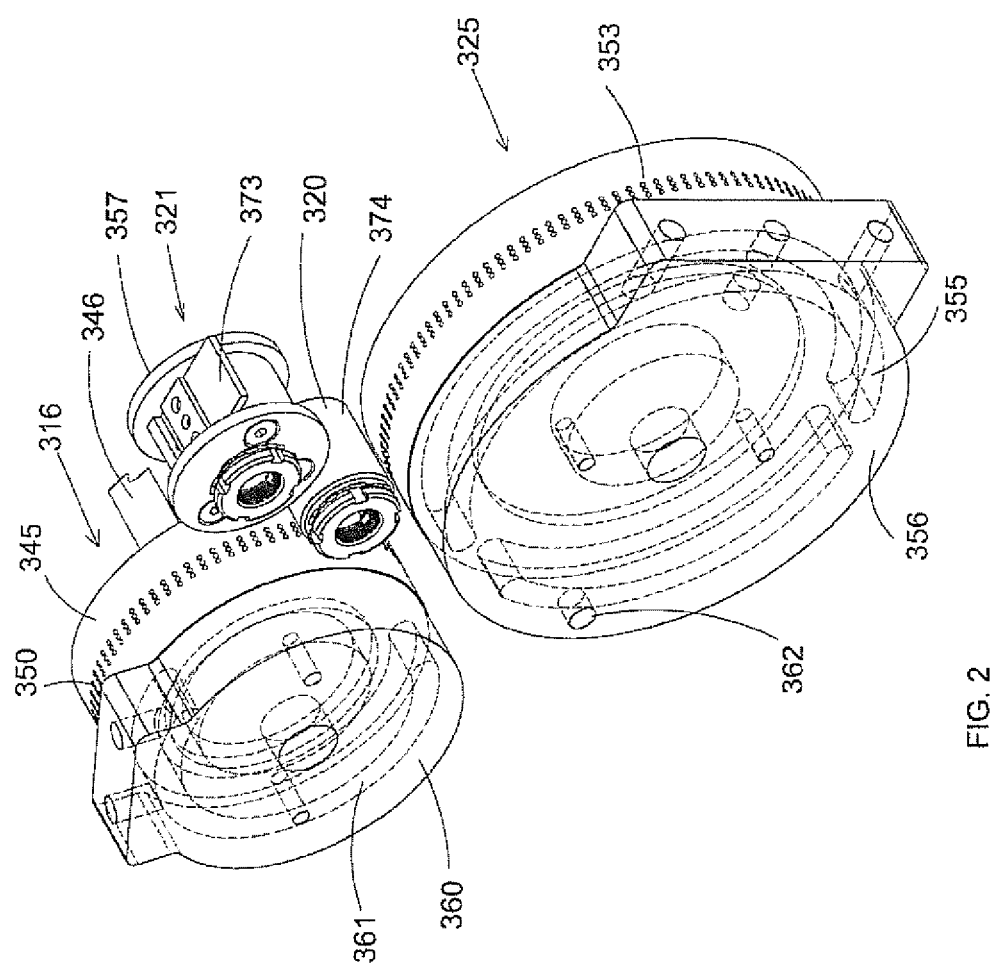
FIG. 2 is a perspective view of a feed section of the material applicator as viewed from the upper right side as shown in FIG. 1.
Figure 3:
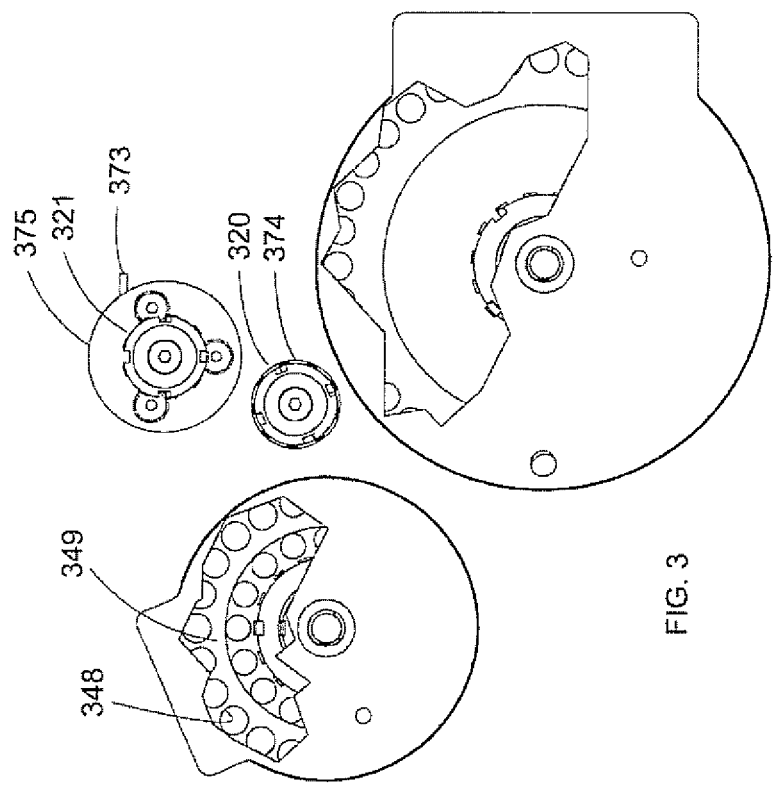
FIG. 3 is a perspective view of the feed section with partial section to illustrate the structure of the various parts.

Cutting may be accomplished by a knife blade 373 mounted on hub 375 of the rotary knife 321. The edges forming the ends of the blade 373 are the cutting edges. When placed in the hub 375, as shown in FIG. 2, an edge extends beyond the periphery of the hub 375 to engage with the anvil roll 320 and affect a cut of the material 311 between a hardened sleeve 374 located at the peripheral surface of the anvil roll 320 and the edge of the blade 373. In certain embodiments, the anvil roll 320 has a different circumference compared to the circumference of the knife roll 321 so that the point of contact of the knife blade 373 varies for each cut thereby extending the life of the anvil roll 320.

According to an embodiment as shown in FIG. 4, a second motor 366, operated through a motor controller 380 drives the feed roll 316. A third motor 351, operated through a motor controller 352 drives the vacuum applicator transfer roll 325. Alternatively, a drive for the substrate conveyor can also drive the vacuum applicator transfer roll 325.

With reference to the general system 310, the anvil roll 320 and knife roll 321 are driven at the same linear speed of the material 311 at the time of material cut. Each time the blade 373 makes contact with anvil roll 320 on the hardened anvil sleeve 374 the material 311 is cut. The material 311 is cut when the desired material length and predetermined material placement has been transferred from the feed roll 316 to the vacuum applicator roll 325. The motor controller 380 for the motor 366 and the motor controller 352 for the motor 351 can change the relationship of the feed roll 16 to the peripheral speed of the vacuum applicator roll 325. As the speed of the feed roll 316 increases with respect to the peripheral speed of the vacuum applicator roll 325 the length of the material 311 gets longer or the placement of the material on the applicator roll is advanced or both. As the speed of the feed roll 316 decreases with respect to the peripheral speed of the vacuum applicator roll 325 the length of the material 311 gets shorter or the placement of the material is retarded, or both. Thus the collaboration between the motor control of the knife roll 321, the feed roll 316, and the vacuum applicator roll 325 determined the length and placement of the material 311 on the substrate 312. In certain embodiments, the feed roll 316 linear speed is equal to, or less than, the linear speed of the vacuum applicator transfer roll 325. At the time of cut, the peripheral speeds of the feed roll 316 and vacuum applicator transfer roll 325 are configured to provide a material 311 linear speed matching the linear speed of the substrate 312. In certain embodiments, the system performs 2 to 10 cuts/second.

Figure 5:
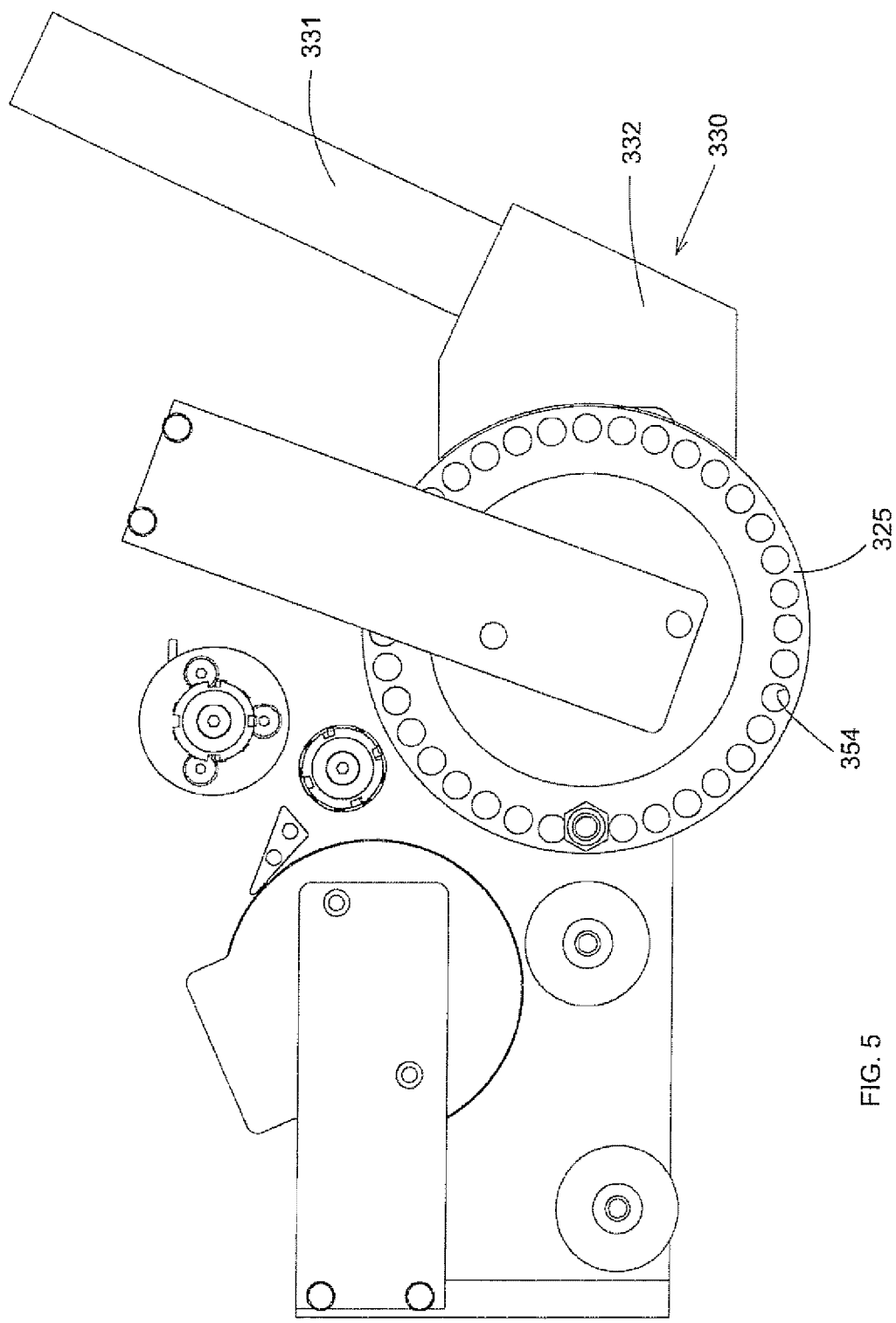
FIG. 5 is a diagrammatic fragmentally elevational view illustrating the features of a material applicator including a convection heat tape preparation system.

The system 310 may also include a material preparation system 330 for treating the material for application to the substrate 312. In FIG. 5, the preparation system includes a heater comprising an air heater 331 and a heat directed shroud 332 positioned about an arcuate portion of the vacuum wheel applicator 325. The cut material section is transferred to the substrate from the surface of the material applicator 325, as the substrate and material length pass between the vacuum wheel 325 and a backup roll 326. The use of the air heater 331 produces excess hot air that flows past the shroud 332. The preparation means may include a resistive heater 333 built into the vacuum applicator transfer roll 325 as illustrated on FIG. 6. The preparation means may include a coating system to coat an adhesive to the material on the applicator 325. Also, a material can be a PSA requiring no preparation prior to application to the substrate. In another embodiment, an adhesive can be applied to the substrate prior to placement of the material such that the material is placed on the adhesive-coated portion of the substrate.

The vacuum wheel applicator 325 may be provided with a foraminous surface formed by a series of holes 353 arranged in axial extending rows connecting with axial holes 354 in the side wall of the roll. The holes 354 are positioned about the end wall near the periphery and during rotation of the roll 325, conununicate with a groove 355 in a manifold 356 with groove or slot 355 extending about 200 to 270 degrees about the circumference of the roll 325 to carry the cut length of material from the point of material cut to the area of transfer to the substrate 312 at the application area defined by the backup roll. Each piece of material must get transferred from the rotary feed roll onto the vacuum wheel applicator. The leading edge of the yet uncut web material must get directed onto the vacuum wheel applicator before the trailing edge can be cut.

As described above, the cut length of material 311 is applied to a substrate 312. The substrate may be transported via a conveyor feed. The substrate conveyor feed section includes rollers and or belts, as known in the art, to move the substrate 312 toward a nip area defined between the vacuum applicator transfer roll 325 and the backup roll 326, and cooperating sensor 358 and a line speed encoder 359 controls for placing the cut length of material precisely on the substrate 312.

The material length placement upon the substrate 321 is controlled by the ICS and motor controller 380 for the motor 366. The ICS and motor controller 380 receive line speed information from the line speed encoder 359 in collaboration with the sensor 358 both positioned along the substrate feed path and driven thereby. The peripheral speed of the vacuum applicator roll 325 is matched to the line speed of the substrate 312 by the motor controller 352 for third motor 351. When beginning a production run of substrates requiring a material length less than, or equal to, that of the substrate 312 length, the machine operator first puts the length of the material information and material placement into the ICS. Any one of a multitude of material lengths can be cut and placed on the substrate. A specific material length and material placement is dictated by a particular production job order. A machine operator simply puts information into the ICS prior to the start of the material application production run. Any one of a multitude of material lengths can be cut and placed in a prescribed location on the substrate as dictated by a particular substrate job order without having to stop the production line. The presently disclosed applicator is very versatile and can be adapted to applying any discrete piece of material of any length, at any position on a substrate of any shape or size. The length of the material can also be varied at will. For example, controlling the feed rate of the material and the cut instant of the material can control the cut length of the material.

To position the length of material properly on the substrate, which may be box blanks which are spaced or continuous carton stock, a sensor 358 having cooperating elements, is positioned along the path of the substrate 312. The sensor 358 will detect the leading edge of a carton or printed registry indicia on the carton substrate, and send this information to the ICS to the motor controller 380 and motor controller 329. The sensor 358 also could detect whether a certain predetermined length of substrate has passed the sensor 358 that is indicative of where material should be applied. The signal from sensor 358 may start the count to the intergraded control system (ICS) which determines the position of the length of material in relationship to the edge of the substrate. The ICS and motor controller 380 and motor 366 and motor controller 329 use this information to control the rotational speed of the feed roll 316 and trigger the knife roll 321 to effect a cut of the material 311 between knife 373 and anvil sleeve 374 at the cut engagement point 322. Exactly when the cut gets made, relative to the position of the moving substrate 312 as the substrate 312 moves towards the nip between vacuum wheel applicator 325 and backup roller 326, defines where the material 311 gets positioned properly on the substrate 312 relative to the edge of the substrate 312. For each complete revolution of the anvil roll 320 and knife roll 321, a knife sensor 333 that detects the rotational position of the knife roll 321. The signal information from the sensor is used to update the ICS and motor controller 380 and controller 329 as to the exact position of the knife blade. This information is used by the ICS and servomotor controller 380 and controller 329 to continuously control the rotational speed of the feed roll 316 and trigger of the knife roll 321, in order for a cut of the material 311 to occur at the correct position for each substrate. In certain embodiments, control of the feed rate of the material is independent of control of the timing of the cut.

The signal from the sensor 358 concerning the presence or absence on the conveyor of a substrate, the presence or absence of registry indicia displayed on the substrate, or the passage of a predetermined substrate length can also be used to automatically enable or disable the feed roll 316. When substrates are detected by the sensor 358, the ICS sends out a signal to the motor controller to enable so that material is advanced through the system.

According to particular examples of the system, the signal from the substrate sensor 358 and the signal from the rotary knife sensor 333 are all received by at least one controller such as, for example, a ICS. The controller then can generate control signals to the motor drives to synchronize together the feed of the material, the rotational trigger of the knife blade, and the position of the substrate (or registry indicia) so that the peripheral speeds of the various rolls are set at the correct level to achieve the desired cutting. For instance, the system can provide feedback for adjusting the placement position of the cut material pieces on substrates if there is an irregularity or non-consistent feed of individual substrates within a single production run. In certain circumstances a single production run may number in the thousands of individual substrates such as cartons. Specifically, substrate sensor 358 detects an irregularity in a substrate feed sufficiently early so that the controller can adjust the speed of the feed roll and/or rotary knife roll to change the timing of the cut, and thus registry of the material piece on the incoming substrates. Such adjustments can occur automatically during the single production run without having to stop the run to make a mechanical adjustment.

When beginning a production run of cartons, a machine operator first inputs material position and placement information into the ICS prior to the start of the material application production run. A predetermined number of carton blanks may be fed through the system prior to material application to allow the system to come up to speed and synchronize the rolls. Any one of a multitude of material positions relative to an edge or index mark can be placed as dictated by a particular carton production job order without having to stop the production line.

The substrate used in the presently disclosed methods and systems may be a carton blank or continuous board. The length of material applied to a carton blank can extend the full length of the carton blank or can be applied only to a portion of the carton length and at a pitch ratio related to the length of the carton blank and the position of the length of material to the carton. The present system 310 is described for use with the vacuum wheel applicator 325 which takes the material 311 advanced to it and applies the cut length to a given area on the carton blank. The material may be a tape placed near the midpoint and may be a reinforcing tape and will then be in a position to reinforce a carrying handle, for example, on the finished carton. The tape, for example, may generally be an adhesive tape comprising a backing of between 2 mils (0.05 mm) to about 7 mils (0.18 mm) in thickness comprised of a polymeric film selected from the group comprising polyester, polypropylene, polyethylene, and mixtures thereof. Alternatively, the backing may be a cellulosic material selected from paper, a paper/polymeric film laminate, or a fiber-reinforced paper.

The material can be applied to the substrate at any substrate speeds. According to certain examples, the substrate speed may be about 200 to about 1200 or higher feet per minute, more particularly about 600 to 1000 feet per minute when a PSA or hot melt adhesive-containing web material is applied to carton blanks.

In certain embodiments, the vacuum applicator transfer roll 325 may be a contoured vacuum applicator roll. For example, in a first embodiment shown in FIG. 7A, the contoured vacuum applicator roll 25 comprises a hub 67 mounted on a shaft 44. The hub 67 includes a first end wall 72 facing the shaft 44, and an opposing second end wall 64. The hub 67 is formed of metal or a composite of material, and may be coated with material having a coefficient of friction sufficient to aid in advancing the material 11. The hub 67 defines a peripheral surface 65 that is generally circular. The peripheral surface 65 defines a contoured portion 59 that has a convex protuberance shape. In certain embodiments, the convex protuberance includes a rounded apex and a spaced apart base. In certain embodiments, the contoured portion 59 consists of a single convex element. The non-adhesive surface of the material 11 may contact about 30 degrees to about 300 degrees of the surface 65 of the roll 25 centered on the contoured portion 59. The roll 25 includes a series of axially extended holes 54 formed in second end wall 64 of the hub. The holes 54 are positioned near the periphery of the roll 25 and are spaced circumferentially to communicate with axial rows of holes 53 defined in the surface 65 of the roll 25, and extending radially into the hub 67 from the peripheral surface 65. Mounted against the second end wall 64 of the hub 67 is a manifold 56. The manifold 56 includes grooved arcuate slot 55 that may extend about 90 to 325 degrees about its end wall adjacent axially to the end wall 64 of hub 67. The manifold 56 is supported in a fixed position by a bracket, and the slot 55 is positioned adjacent the path of the axially extended holes 54 on the hub 67. As the hub 67 of the contour roll 25 rotates, the holes 54 serially come into communication with the slot 55 and air is exhausted from the holes 54 and from the holes 53 creating a force against one side of the material 11 that is less than atmospheric (e.g., a vacuum), and thus the less-than atmospheric pressure holds the material 11 against the foraminous surface 65 of the roll 25 in the area of the slots 55 as it rotates the holes 54 along the slot 55. As the contoured vacuum roll 25 rotates, the holes 54 become aligned or substantially aligned with the slot 55 and the holes 53 draw the web material 11 against the surface 65 of the vacuum roll 25. The material 11 conforms to the shape of the contoured portion 59 when drawn against the surface 65 of the contoured roll 25. This moves the material 11 along with the rotation of the vacuum roll 25. During the continued rotation, the holes 54 are covered by the adjacent end wall of the manifold 56. The pressure holding the material on the surface of the roll 25 over the holes 53 is such that the roll 25 moves the material 11 at the same speed as the roll 25, not allowing slippage of material 11 on the roll 25.

Figure 8C:
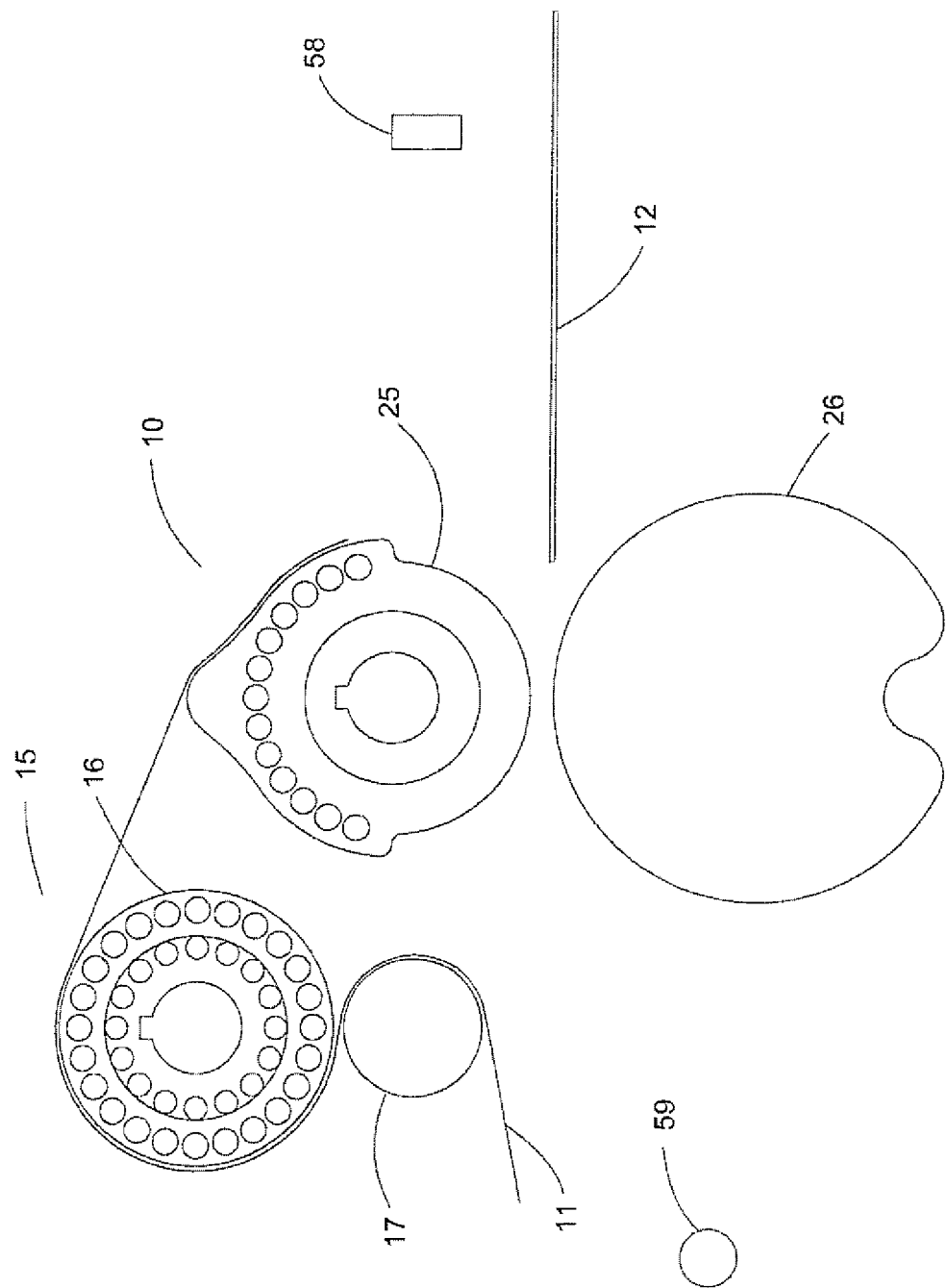

A second embodiment of a contoured vacuum roll 25 is shown in FIG. 8A. The periphery of vacuum roll 25 of FIG. 8A also includes a recessed portion 63 in addition to a contoured portion 59. The recessed portion 63 extends circumferentially around a section of the periphery of the vacuum roll that is opposing to the contoured portion 59. A first shoulder 33 is contiguous between a first end of the contoured portion 59 and a first end of the recessed portion 63, and a second shoulder 34 is contiguous between a second end of the contoured portion 59 and a second end of the recessed portion 63.

Figure 9A:
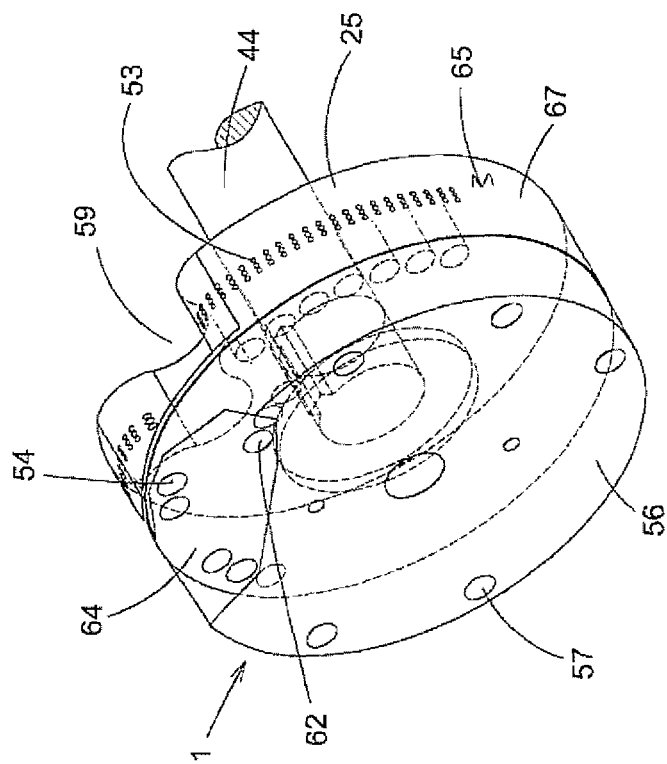
FIG. 9A is a perspective view of a third embodiment of a contour vacuum applicator roll as viewed from the upper right side.
Figure 9C:
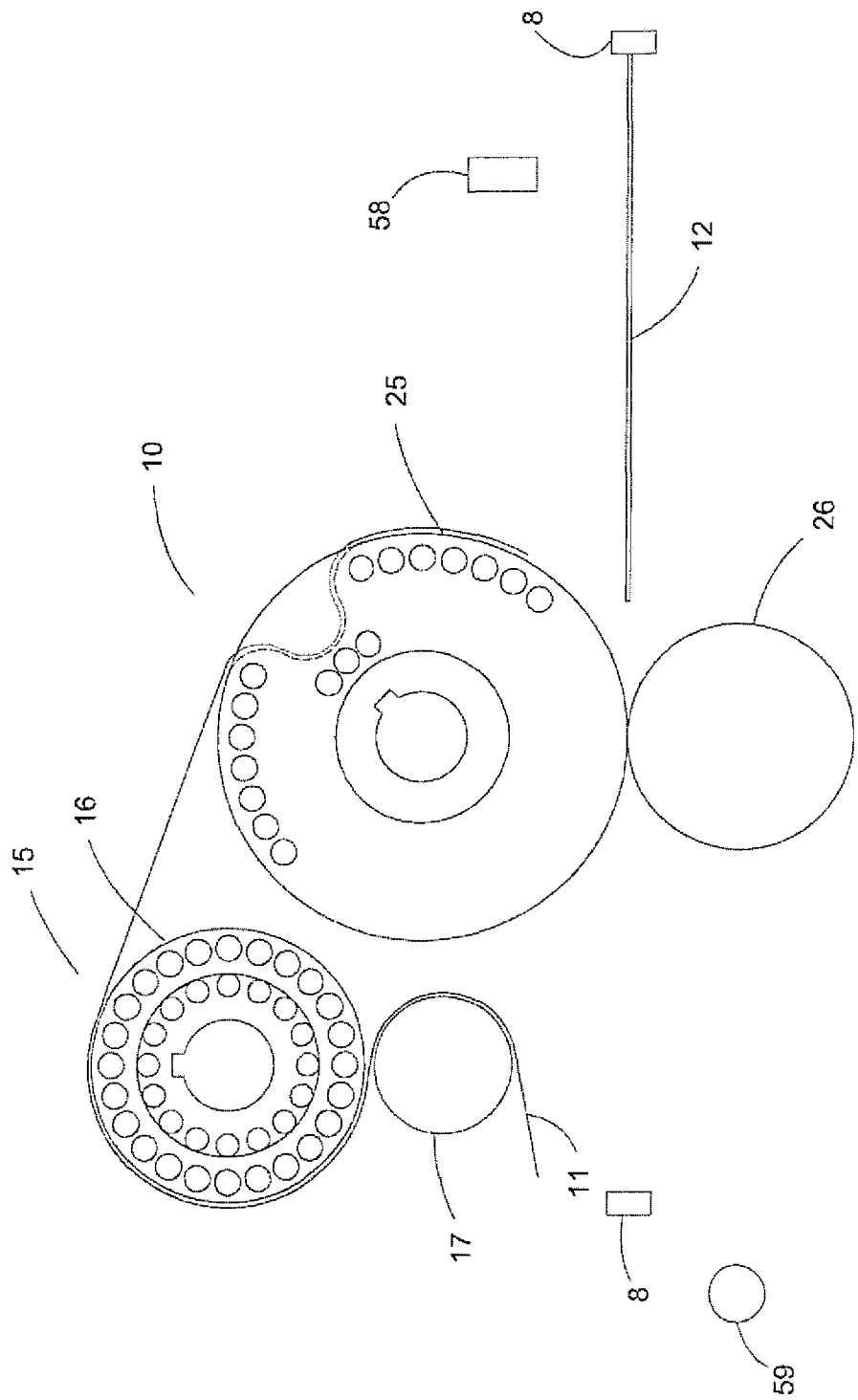
Figure 9D:
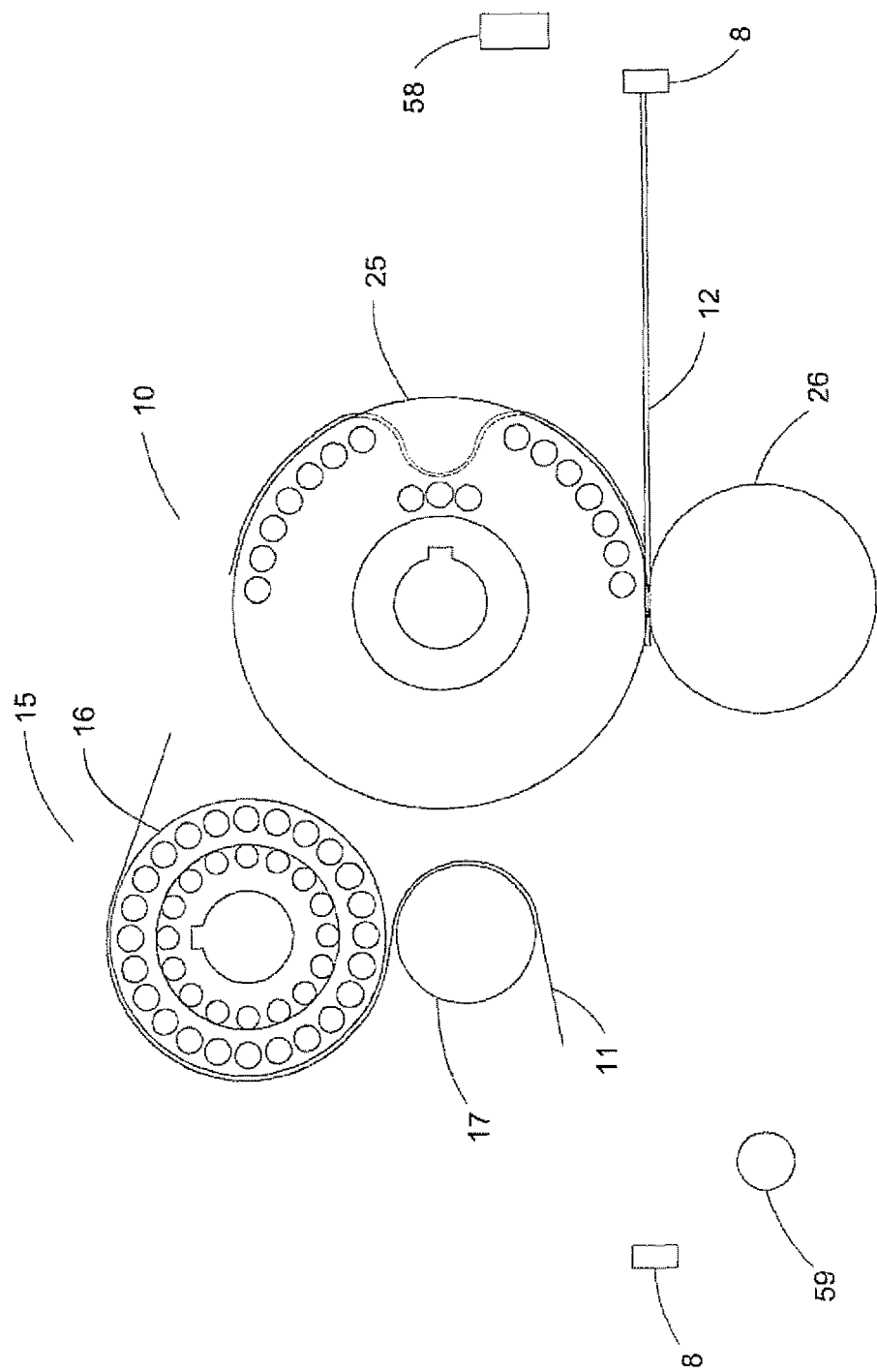
Figure 9E:
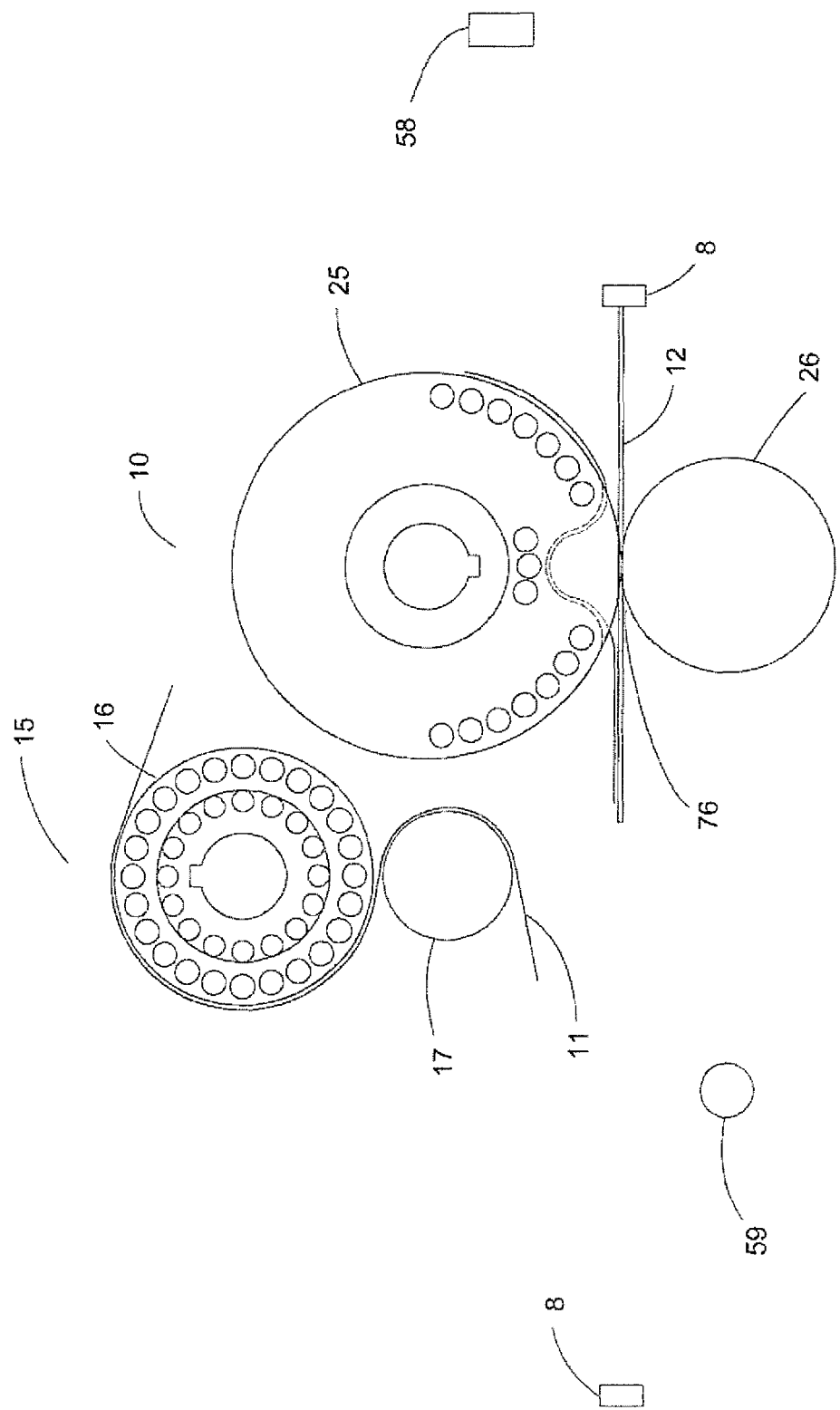
Figure 9F:
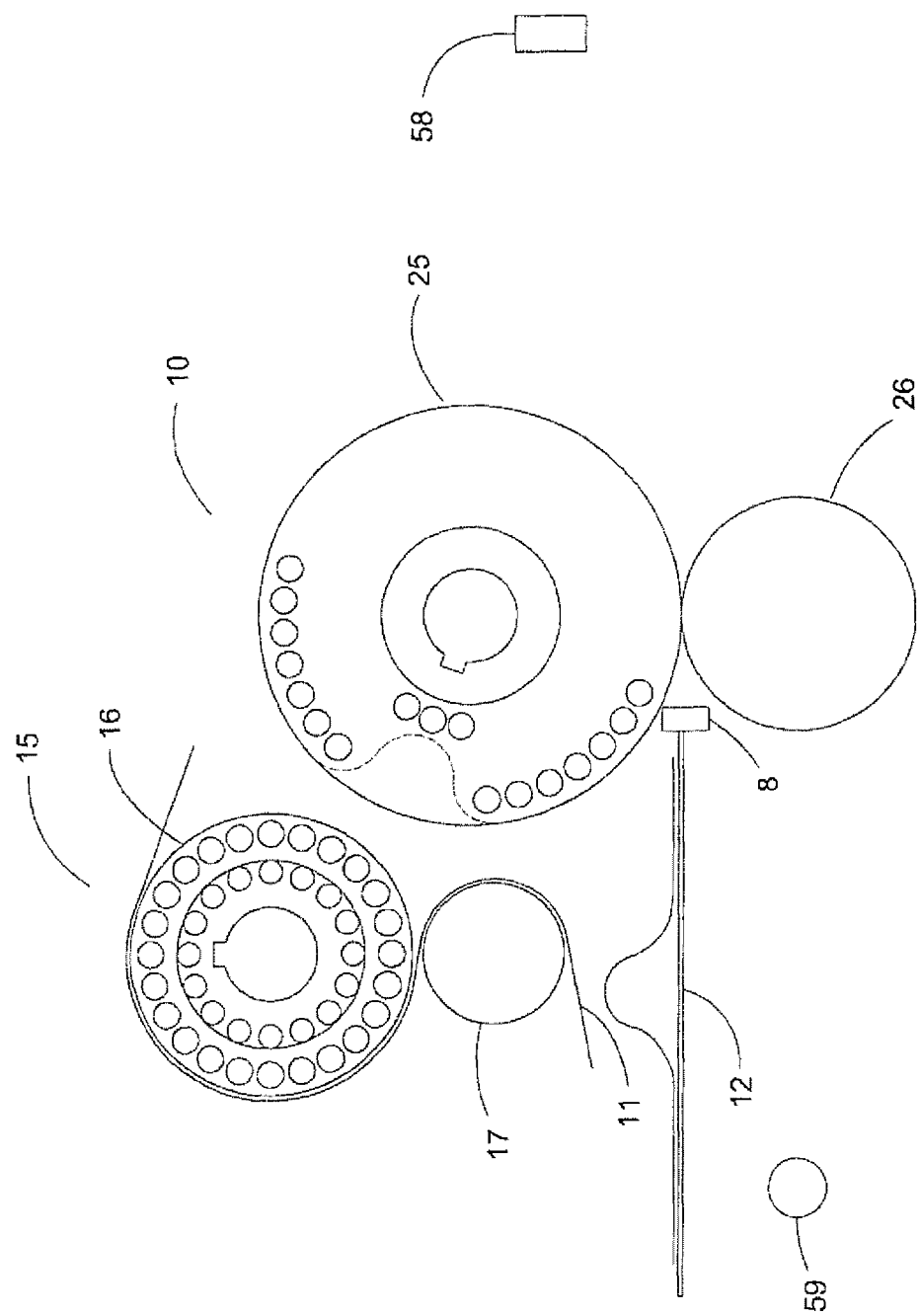

A third embodiment of a contoured vacuum roll 25 is shown in FIG. 9A. The peripheral surface 65 defines a contoured portion 59 that has a concave groove shape. In certain embodiments, the concave groove includes a rounded inverted apex and a spaced apart opening. In certain embodiments, the contoured portion 59 consists of a single concave element.

Figure 10A:
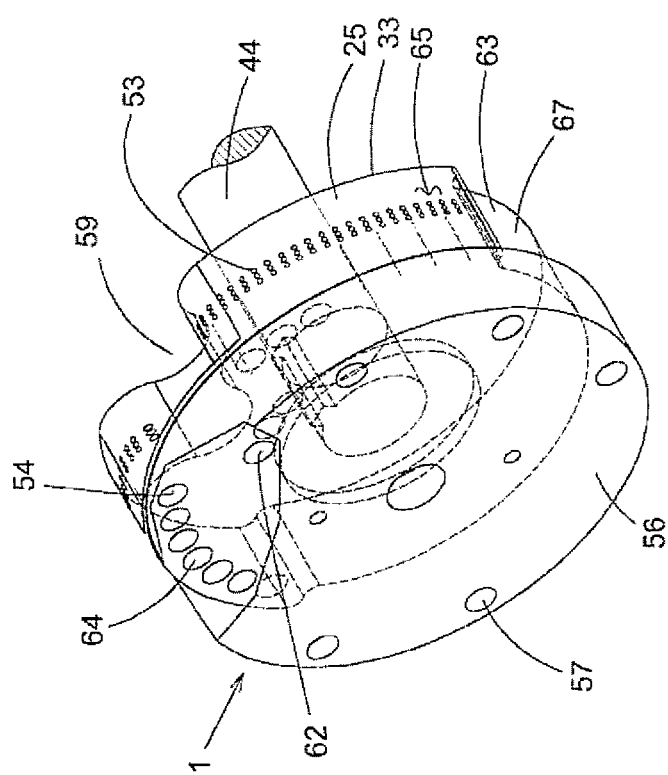
FIG. 10A is a perspective view of a fourth embodiment of a contour vacuum applicator roll as viewed from the upper right side.
Figure 10B:
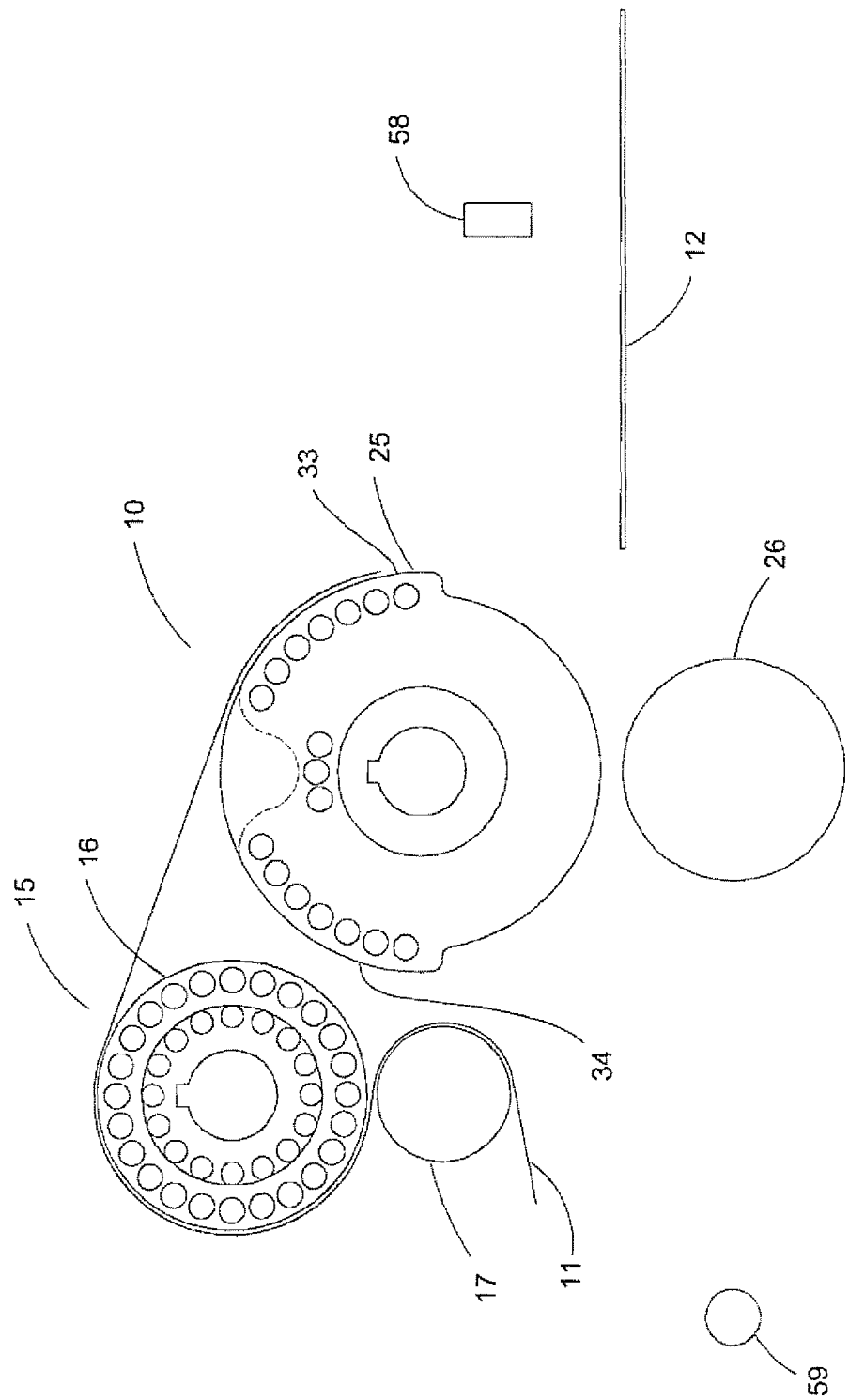
FIG. 10B-10F is a diagrammatic fragmentally elevational view of the fourth embodiment illustrating the features of an applicator system.
Figure 10D:
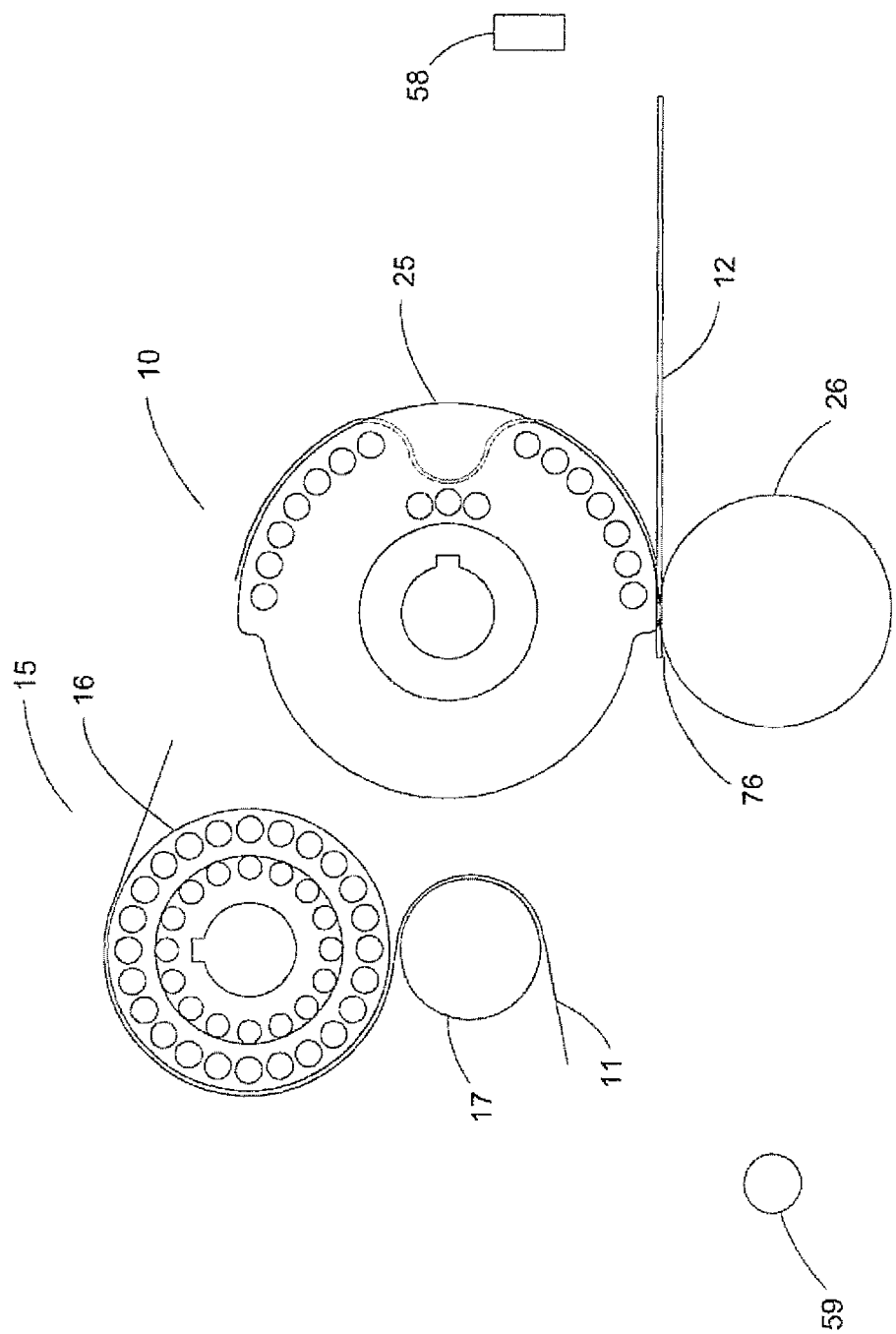
Figure 10C:
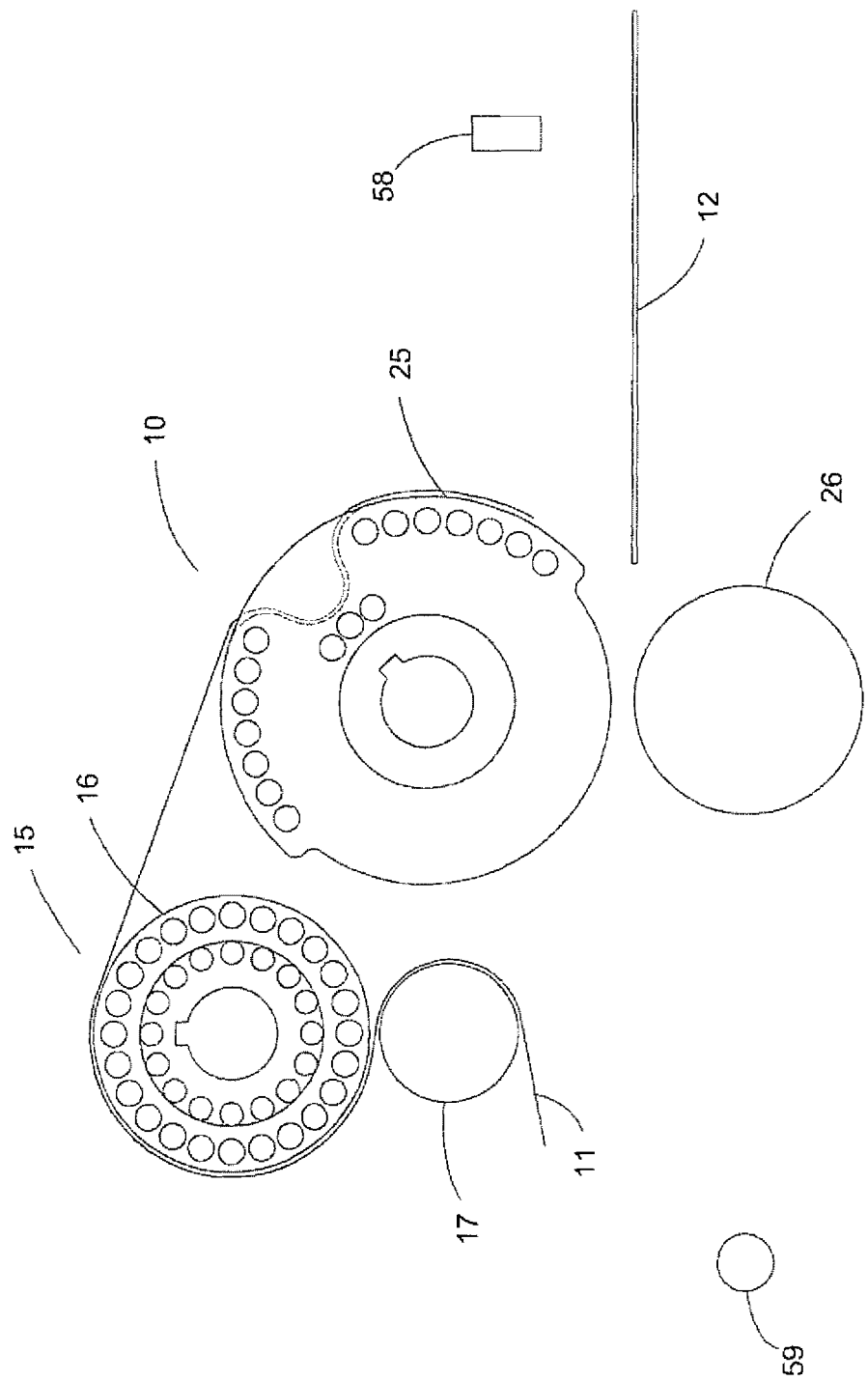
Figure 10E:
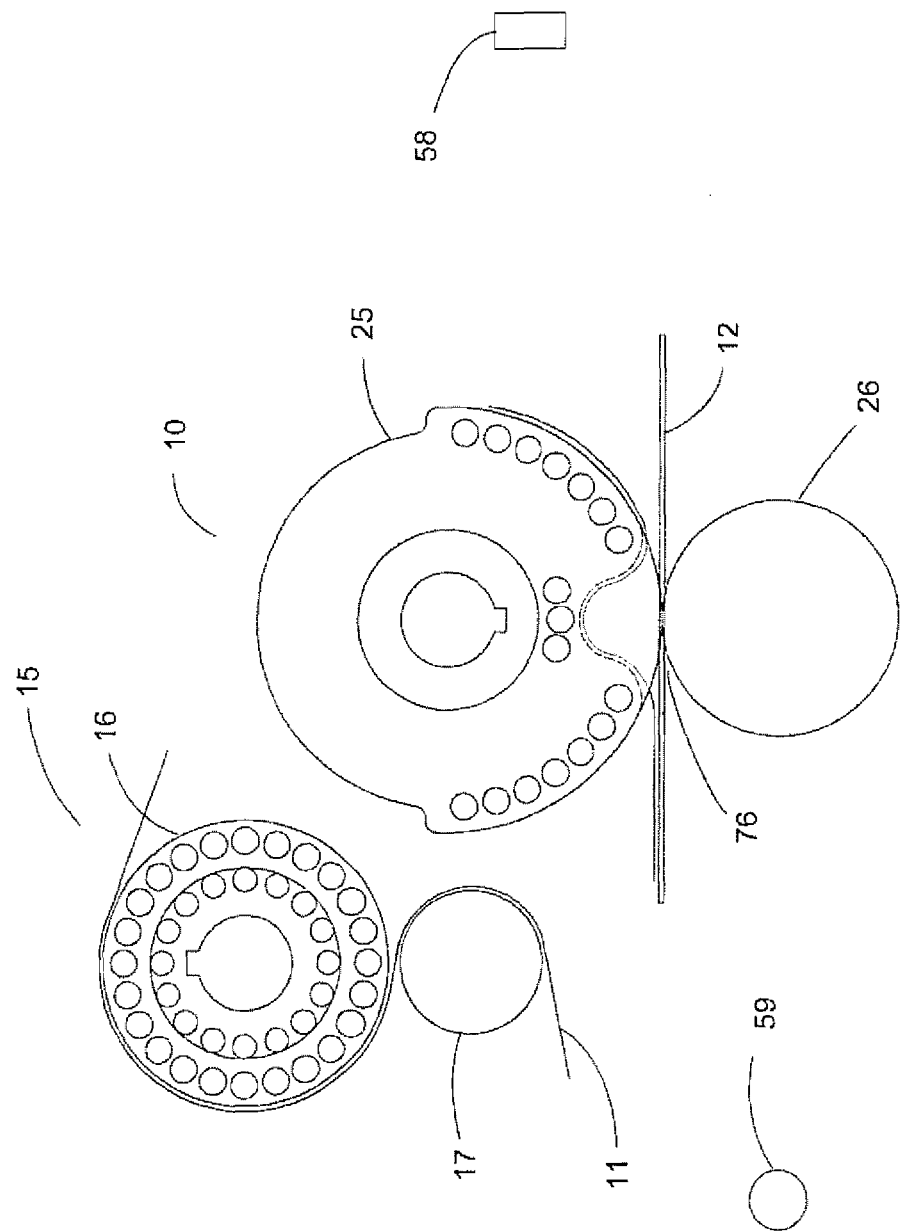
Figure 10F:
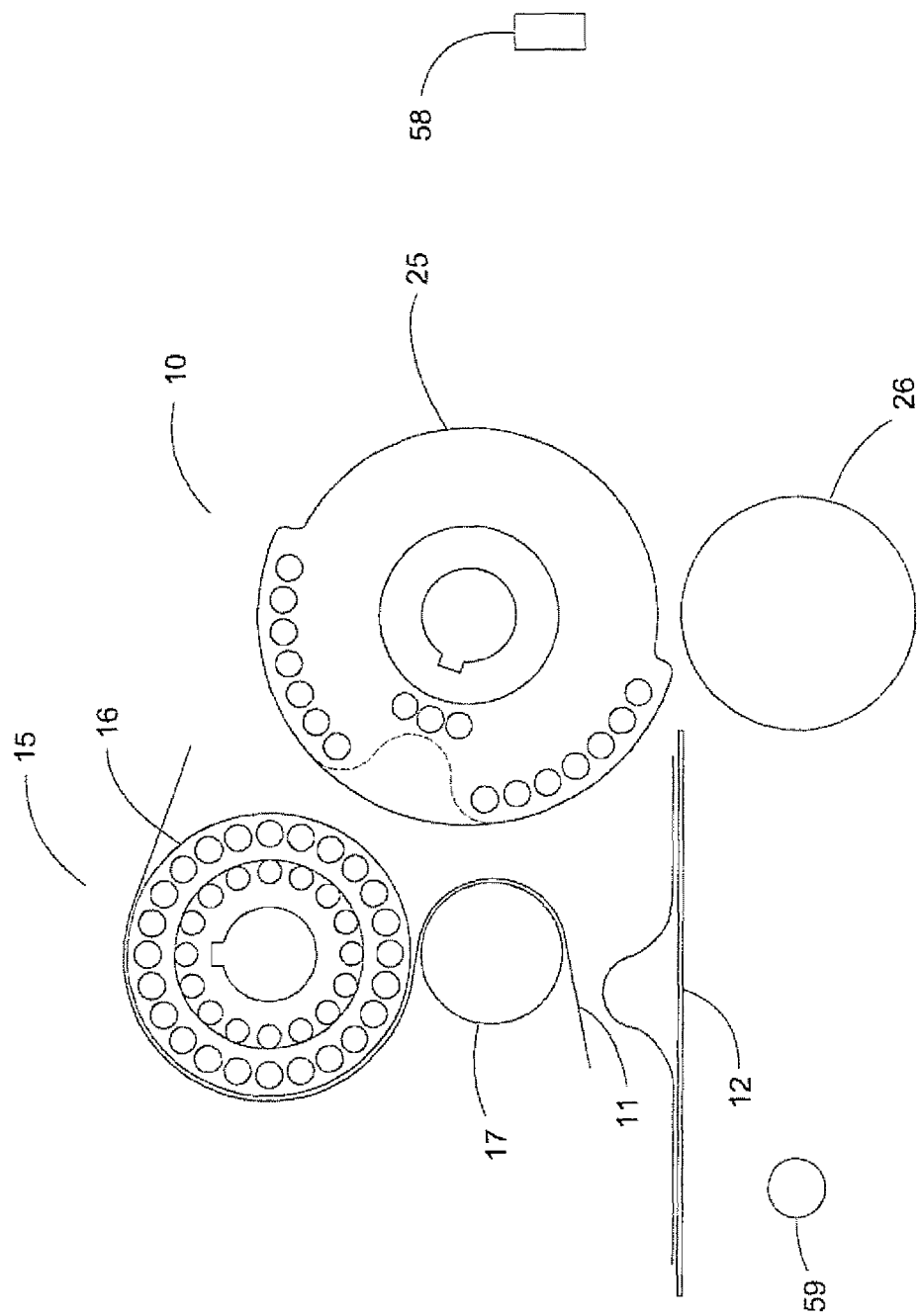

A fourth embodiment of a contoured vacuum roll 25 is shown in FIG. 10A. The periphery of vacuum roll 25 of FIG. 10A also includes a recessed portion 63 in addition to a contoured portion 59. The recessed portion 63 extends circumferentially around a section of the periphery of the vacuum roll that is opposing to the contoured portion 59. A first shoulder 33 is contiguous between a first end of the contoured portion 59 and a first end of the recessed portion 63, and a second shoulder 34 is contiguous between a second end of the contoured portion 59 and a second end of the recessed portion 63.

Figure 7A:
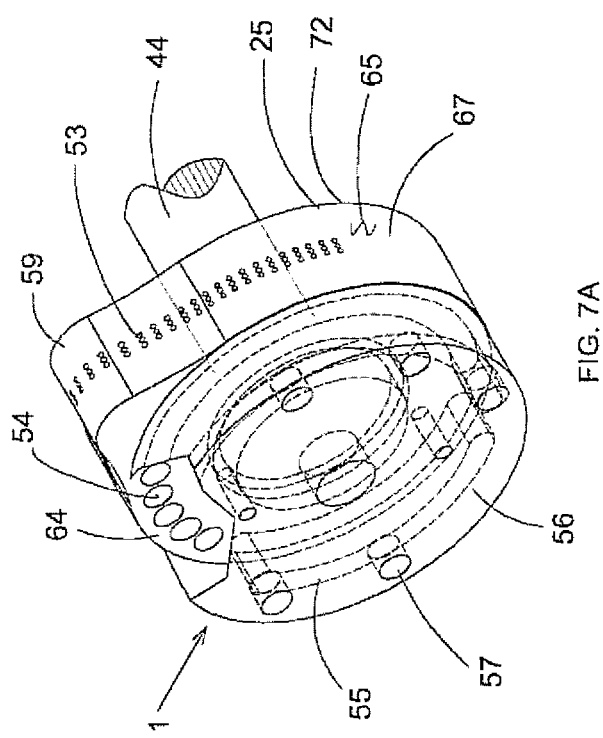
FIG. 7A is a perspective view of a first embodiment of a contour vacuum applicator roll as viewed from the upper right side.
Figure 7C:
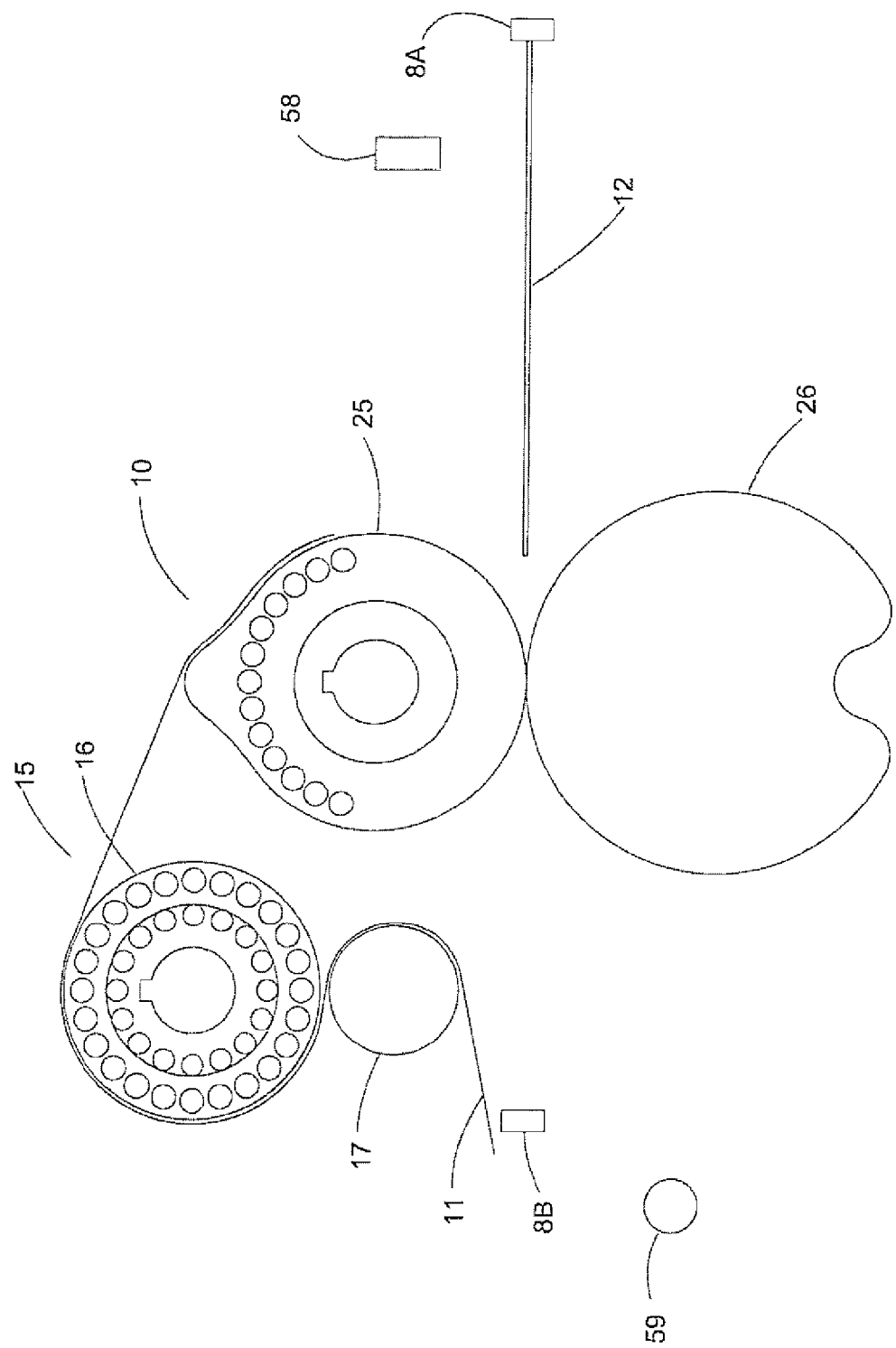
Figure 7D:
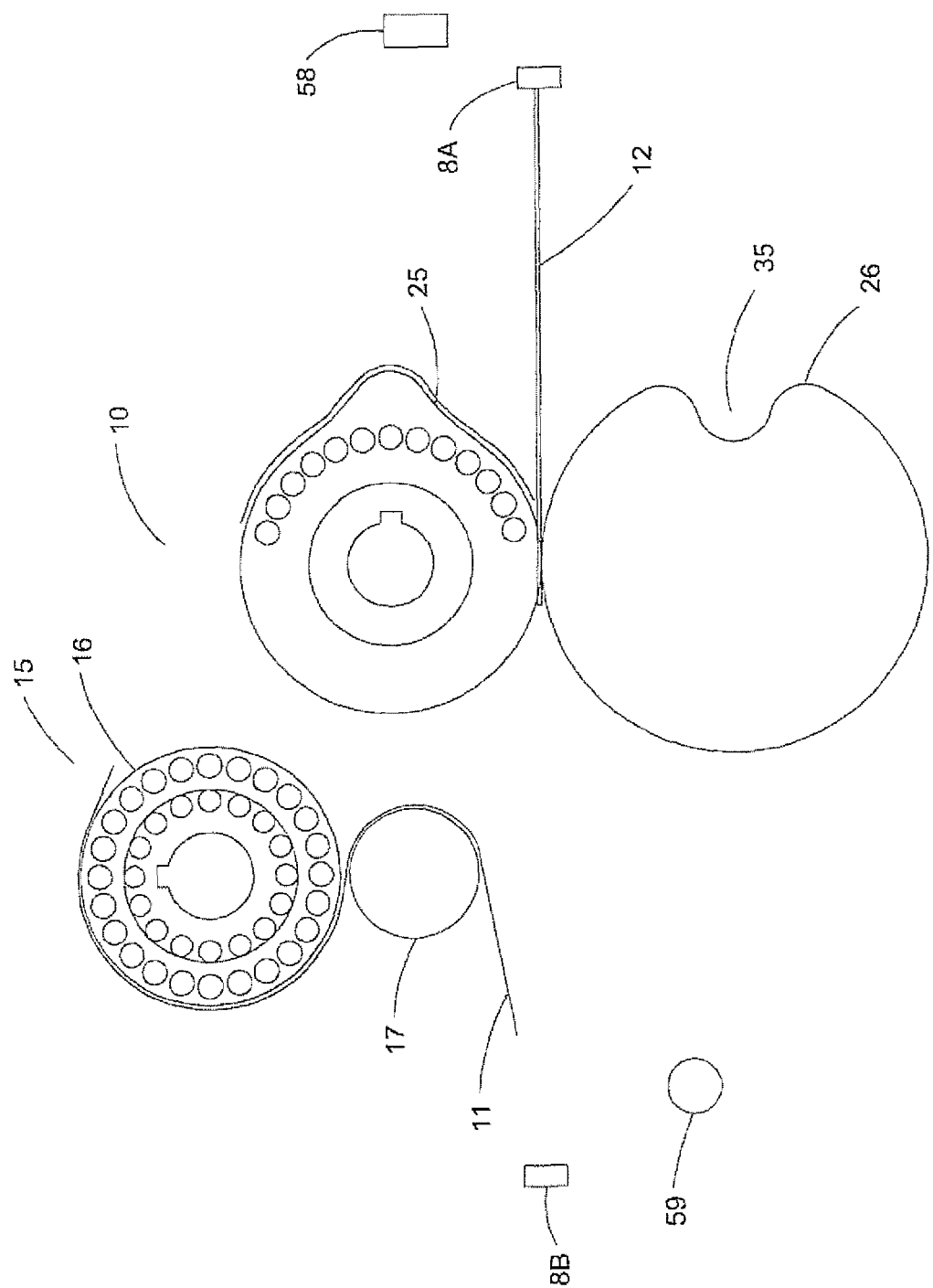
Figure 7E:
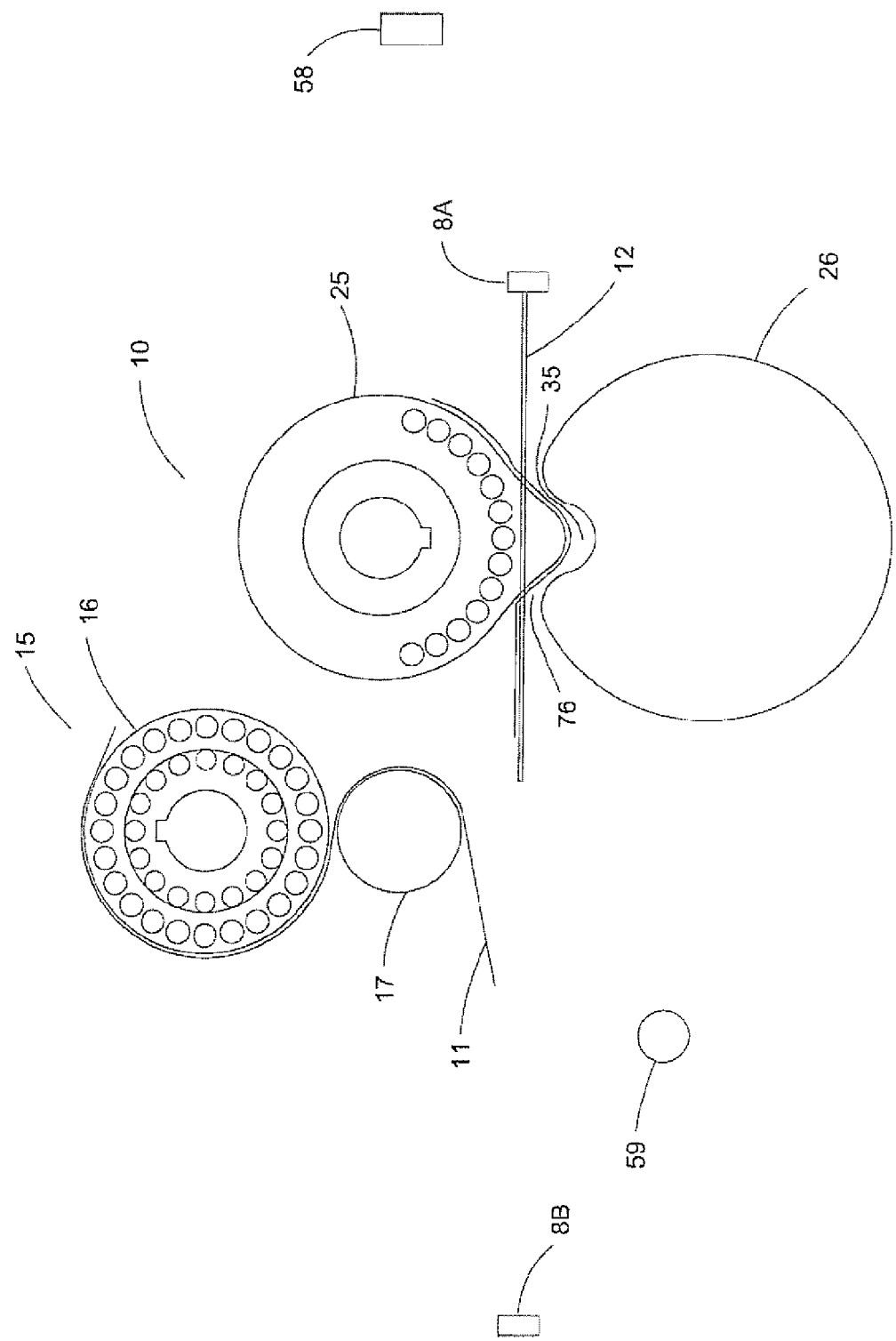

In the embodiment of FIG. 7A, the contoured vacuum roll 25 has a convex contoured portion 59 to allow for material application with a timed feed as shown on FIGS. 7B-7F. The contoured vacuum roll 25 holds the leading edge of each cut length of material on the applicator roll 25 until it can be transferred onto the substrate 12. As the applicator roll 25 rotates, the leading edge of the material 11 advances past the end of the vacuum created section (defined by the area occupied by holes 53 when holes are engaged with arcuate groove 55 via holes 54). The leading edge of the material 11 is now no longer under the control of the vacuum applicator roll 25. Gravity and/or an air jet 57 cause the leading edge of the material 11 to leave the applicator roll 25 and to fall against substrate 12. As the vacuum roll 25 rotates, it continues to pick up more of the length of the material 11.

FIGS. 7B-7F, 8B-8F, 9B-9F, and 10B-10F depict applicator systems that include the first, second, third or fourth embodiments of the roll 25, respectively. Each set of FIGS. 7B-7F, 8B-8F, 9B-9F, and 10B-10F show the progression of a substrate 12 through the system 10. The applicator systems include an element that forms a nip 76 with the vacuum roll 25. In the depicted embodiments the element is a back roll 26, but the element could alternatively be a back belt or similar structures. The nip 76 is the region in which the cut length of material 11 is transferred from the vacuum roll 25 to the substrate 12.

In the systems of FIGS. 7B-7F and 8B-8F the convex contoured portion 59 of the roll 25 meshes with a concave notch 35 formed in the periphery of back roll 26. Meshing can be accomplished through mechanical, electromechanical, or electrical coupling the vacuum roll 25 with the back roll 26. In this embodiment, the shaft 44 is driven by a motor, such as a servomotor. Timing of the meshing of the vacuum roll 25 and the back roll 26 may be done through other power transmission and synchronization means known in the art including electronic coupling rather than mechanical coupling.

The first and third embodiments depicted in FIGS. 7A-7F and FIGS. 9A-9F respectively depict timed feed embodiments. The contoured vacuum roll 25 contoured portion 59 is synchronized with the back roll 26, upstream lug 8A and downstream lug 8B. In a timed feed application there is a fixed distance between lugs 8A and 8B on the substrate feed conveyor. The lug 8A contacts the leading edge of the substrate 12, thus indicating the presence and position of substrate 12. The fixed distance between two adjacent lugs defines the job space that the substrate falls within. The job-space is equal in length to the circumference πD of the vacuum roll 25 and back roll 26 in the embodiment shown in FIGS. 7A-7F. Synchronization of the vacuum roll 25 to the back roll 26 and the lugs 8A and 8B can be accomplished through electro-mechanical, electrical, or mechanical coupling known in the art.

The second and fourth embodiments depicted in FIGS. 8A-8F and 10A-10F, respectively, depict non-timed feed (random feed) embodiments. In a non-timed or random feed application there is not a fixed distance or job-space between the leading edge of one substrate to the leading edge of the adjacent substrate—i.e. no lugs 8 define a fixed job space. As described above, the contoured cut length of material 11 is applied to a substrate 12. The substrate may be transported via a conveyor feed. The substrate conveyor feed section includes rollers and or belts, as known in the art, to move the substrate toward the nip area. The substrate 12 position and speed on the feed conveyor is determined by collaboration of sensor 58 and a line speed encoder 59. For non-timed feed the material placement upon the substrate is controlled by collaboration between a motor (not shown) and motor controller (nor shown) coupled to the shaft 44 of the vacuum roll 25 and the conveyor feed. The collaboration between these elements is synchronized through an Integrated Control System (ICS) such as Allen Bradley's Control Logix integrated control system. The ICS receives line speed information from the line speed encoder 59, the substrate sensor 58 both positioned along the substrate feed path and driven thereby. The peripheral speed of the vacuum roll 25 is matched to the line speed of the substrate 12 to properly position the web on the substrate just prior to the peripheral surface 65 of roll 25 coining in contact with the substrate 12 by the motor controller.

Figure 8D:
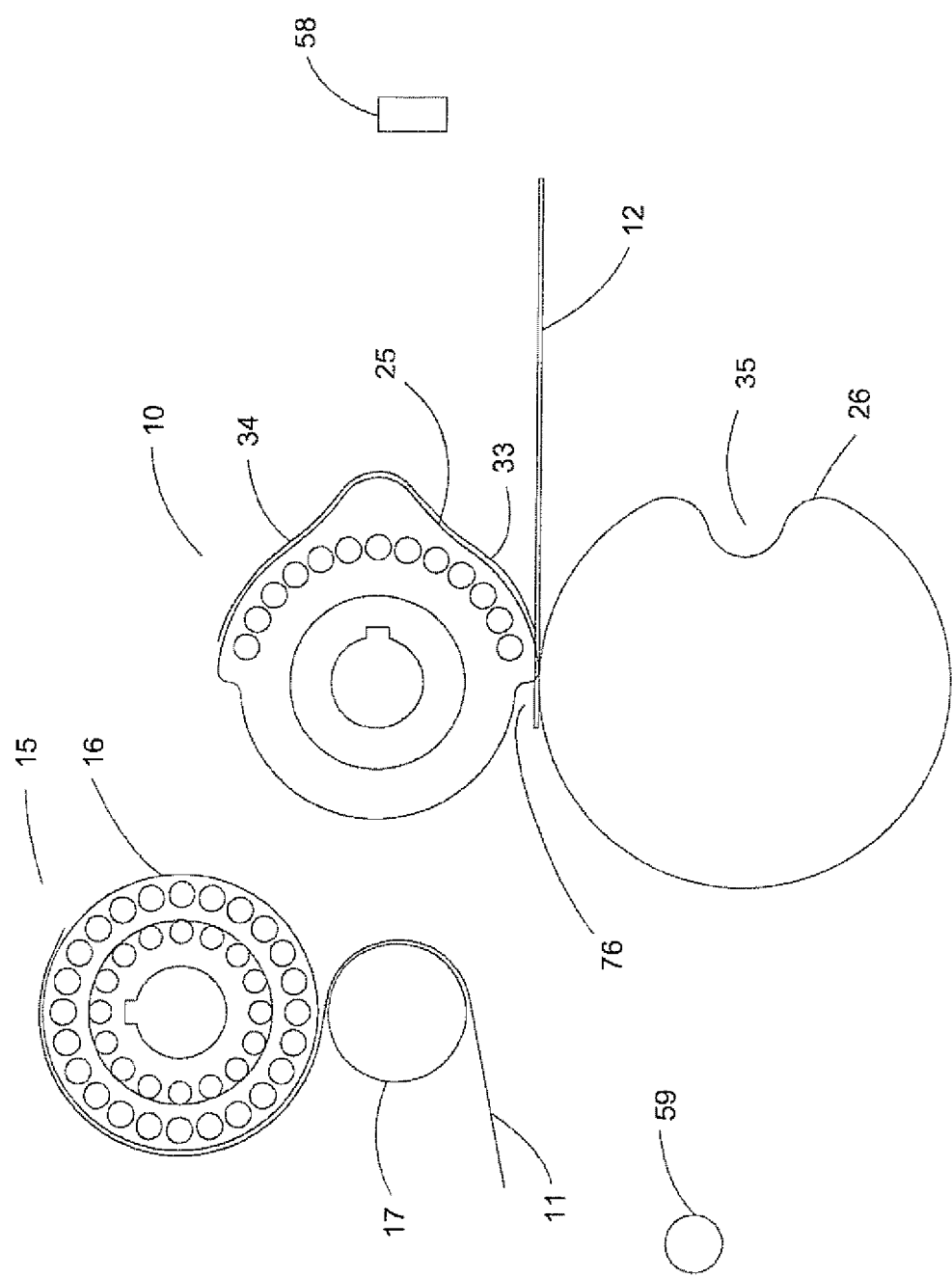

In the non-timed embodiments of FIGS. 8 and 10, recessed portion 63 does not contact the substrate 12 as the vacuum roll 25 rotates (see FIGS. 2B, 2C, 4B and 4C). As the end of the recessed portion 63 rotates past the nip area 76, first shoulder 33 comes into contact with the substrate 12 (see FIGS. 8D and 10D). As vacuum roll 25 continues to rotate, contoured portion 59 meshes with concave notch 35 formed in the back roll 26 (see FIG. 8E) or the contoured portion 59 passes over substrate 12 (see. FIG. 10E). The second shoulder 34 then contacts substrate 12. As the first shoulder 33, contoured portion 59, and second shoulder 34 successively pass the substrate surface, and simultaneously form a nip with the back roll 26, the vacuum roll 25, back roll 26, and the substrate 12 run at the same linear speed. However, when the first shoulder 33, contoured portion 59, or second shoulder 34 are not in contact with substrate 12 the substrate conveyor speed and the peripheral speed of vacuum roll 25 are not required to be equal. For example, the vacuum roll 25 could idle or run at a slower speed relative to the substrate conveyor speed, when the first shoulder 33, contoured portion 59, or second shoulder 34 are not in contact with substrate 12. This allows for the continuous production of non-equidistant substrates.

In the second embodiment shown in FIGS. 8A-8F, the contoured vacuum roll 25 section includes a convex contoured portion 59 and a recessed portion 63 to allow for material application without a timed feed.

In the third embodiment shown in FIGS. 9A-9F, the contoured vacuum roll 25 has a concave contoured portion 59 to allow for material application with a timed feed as described above in connection with FIGS. 7B-7F.

In the fourth embodiment shown in FIGS. 10A-10F, the contoured vacuum roll 25 has a concave contoured portion 59 and a recessed portion 63 to allow for material application without a timed feed as described above in connection with FIGS. 8B-8F.

The system 10 may include a feed section 15 that includes a material feed roll 16 and an idler pulley 17 for advancing the material from a feed material supply. The system 10 may also include a material preparation section for treating the material for application to the substrate 12. The preparation section may include a heater for applying heat to the material as it is on the vacuum roll 25. The cut material section is transferred to the substrate from the surface of the roll 25, as the substrate 12 and material length pass between the nip 76 formed between the vacuum roll 25 and the back roll 26. The preparation section may include a coating system to coat an adhesive to the material prior to introduction of the material onto roll 25. Alternatively, the system may include an adhesive coating system to coat an adhesive as it is on the material on the roll 25. The feed material could be pretreated with an adhesive prior to use in system 10. The material 11 may be cut (e.g., with a knife roll) at any point prior to placement of the material 11 onto the substrate 12.

As described above, the contoured cut length of material 11 is applied to a substrate 12. The substrate may be transported via a conveyor feed. The substrate conveyor feed section includes rollers and or belts, as known in the art, to move the substrate toward the nip area, and cooperating sensor 58 and a line speed encoder 59 controls for placing the cut length of material precisely on the substrate 12. The material placement upon the substrate 12 may be controlled by an integrated control system (ICS) and motor. The ICS and motor controller receive line speed information from the line speed encoder 59 in collaboration with the sensor 58 both positioned along the substrate feed path and driven thereby. The peripheral speed of the vacuum applicator roll 25 is matched to the line speed of the substrate by the motor controller. When beginning a production run of cartons requiring a material length less than that of carton length, the machine operator first puts the length of the material information and material placement into the ICS. Any one of a multitude of material lengths can be cut and placed on the substrate. A specific material length and placement is dictated by a particular carton production job order. A machine operator simply puts information into the ICS prior to the start of the material application production run. Any one of a multitude of material lengths can be cut and placed in a prescribed location on the carton blank as dictated by a particular carton production job order without having to stop the production line.

The substrate used in the presently disclosed methods and systems may be a carton blank or continuous board. The length of contoured material applied to a carton blank can extend the full length of the carton blank or can be applied only to a portion of the carton length and at a pitch ratio related to the length of the carton blank or web and the position of the length of material to the carton. The present applicator section 10 is described for use with the contoured vacuum roll 25 which contours and places the material onto the substrate 12. The contoured material placed on the substrate may serve as a carry handle, for example, on a finished carton. In one embodiment, to create a carry handle with the roll 25 depicted in FIGS. 3 and 4 the depth of the concave portion is approximately between 1 to 2 inches with a width of approximately 3 to 5 inches. In other embodiments, the dimensions may be different. Likewise, to create a carry handle with the roll 25 depicted in FIGS. 7 and 8 the height of the convex section is approximately between 1 and 2 inches with a width of approximately 3 to 5 inches. In other embodiments, the dimensions may be different. More generally, the proportion between the depth or height of the contoured portion to the base width of the contoured portion ranges from 1:5 to 2:3, including 2:5 and 1:3. The material, for example, may generally be an adhesive tape comprising a backing of between 2 mils (0.05 mm) to about 7 mils (0.18 mm) in thickness comprised of a polymeric web selected from the group comprising polyester, polypropylene, polyethylene, and mixtures thereof.

In certain embodiments, an opening such as an elongated or rectilinear opening is present in the substrate. The contoured portion 59 of the material 11 may be inserted into the substrate opening in the "convex" embodiments shown in FIGS. 7A and 8A. The contoured material may be applied over the substrate opening in the "concave" embodiments shown in FIGS. 9A and 10A. In the embodiments of FIGS. 9A and 10A the contoured portion 59 may be displaced through the substrate opening after application of the cut length of material to the substrate 12 (e.g., by displacement element downstream from the vacuum roll 25 or by hand). In these embodiments, the contoured material forms a handle comprising a flexible strip forming a collapsible loop having a continuous curvature along the full length of the loop that extends through the length of the opening in the substrate, wherein first and second portions of the flexible strip are adhesively affixed to the substrate as described below in more detail.

For example, also described herein are embodiments of a handle for an article, such as paper board or corrugated paper board containers that can be made by the systems and methods disclosed herein. The handle includes a flexible strip forming a loop that is affixed to an interior surface of a panel or flap of the corrugated or paperboard package. The strip extends through a complementary opening on the panel or flap and can extend vertically because of the formed loop to form a hand hold. The complementary opening may be covered by a panel larger than the complementary opening, wherein the panel is affixed to the interior surface of the panel or flap overlapping the strip affixed to the interior surface of the panel. Generally, the handle may be applied to a paperboard substrate or corrugated paperboard substrate during manufacturing of the substrate (e.g., a container blank). The handle disclosed herein is not a pre-formed handle unit (i.e., a two-part unit that includes a handle and a carrying element).

In certain embodiment, the substrate may be a corrugated paper board. The corrugated board substrate includes an exterior liner and a corrugated member. In some implementations, the corrugated member consists of a series of parallel flutes. However, in other implementations, the corrugated member can include other configurations, such as a waffle-type pattern or honeycomb. The corrugated paper board may be a single wall structure (i.e., includes a single fluted corrugated medium and at least one liner layer) or a multiwall structure (i.e., includes at least two fluted corrugated mediums and at least one liner layer). One or more substrates can form an article of manufacture such as a packaging container. Examples of packaging containers include cartons and boxes, such as cartons for holding beverages for sale at the retail level (for instance, a hand-carry carton that holds six, 12 or 24 bottles or cans of a beverage), meat and produce bulk bins, wet-packed containers, reusable containers, rubber and chemical bulk bins, heavy duty containers, bags, electronics and envelopes. A continuous corrugated board substrate can be manufactured by bonding the corrugated member to the exterior liner using an adhesive, and subjecting the exterior liner and corrugated member to heat.

In view of the many possible embodiments to which the principles of the disclosed invention may be applied, it should be recognized that the illustrated embodiments are only preferred examples of the invention and should not be taken as limiting the scope of the invention.

What is claimed is:

1. A system for applying a material to a substrate comprising:
   a feed section that comprises a feed roll and configured for advancing a material along a predetermined path;
   a material applicator roll configured to receive the material from the feed roll and apply a cut length of material to a substrate, wherein the material applicator roll comprises a vacuum roll defining a peripheral surface having a contoured portion forming a convex shape;
   a knife element located between the feed section and the material applicator roll; and
   a non-vacuum anvil roll positioned near the knife element.

2. The system of claim 1, further comprising a first drive for the feed roll, a second drive for the knife element, and a third drive for the material applicator roll.

3. The system of claim 2, wherein the first drive comprises a first motor, the second drive comprises a second motor, and the third drive comprises a third motor.

4. The system of claim 1, wherein the knife element comprises a knife roll.

5. A system for applying a material to a substrate comprising:
   a feed section that comprises a feed roll and configured for advancing a material along a predetermined path;
   a material applicator roll configured to receive the material from the feed roll and apply a cut length of material to a substrate, wherein the material applicator roll comprises a vacuum roll defining a peripheral surface having a contoured portion forming a convex shape;
   a knife element located between the feed section and the material applicator roll; and
   a non-vacuum anvil roll positioned near the knife element; and
   an element forming a nip with the material applicator roll, wherein the element defines a peripheral surface, wherein the peripheral surface has a concave portion that conforms to the convex shape of the material applicator roll.

6. The system of claim 5, further comprising a first drive for the feed roll, a second drive for the knife element, and a third drive for the material applicator roll.

7. The system of claim 5, wherein the knife element comprises a knife roll.

8. A system for applying a material to a substrate comprising:
   a feed section that comprises a feed roll and configured for advancing a material along a predetermined path;
   a material applicator roll configured to receive the material from the feed roll and apply a cut length of material to a substrate, wherein the material applicator roll comprises a vacuum roll defining a peripheral surface having a contoured portion forming a concave shape located between a first end of a first elevated section and a first end of a second elevated section and wherein the vacuum roll peripheral surface further includes a recessed portion opposite the concave shape and contiguously spanning between a second end of the first elevated section and a second end of the second elevated section;
   a knife element located between the feed section and the material applicator roll; and a non-vacuum anvil roll positioned near the knife element.

* * * * *